US006052105A

United States Patent [19]

Yamamoto et al.

[11] Patent Number: 6,052,105

[45] Date of Patent: Apr. 18, 2000

[54] WAVE GENERATION CIRCUIT FOR READING ROM DATA AND GENERATING WAVE SIGNALS AND FLAT MATRIX DISPLAY APPARATUS USING THE SAME CIRCUIT

[75] Inventors: Akira Yamamoto; Masaya Tajima; Toshio Ueda; Hirohito Kuriyama; Katsuhiro Ishida; Yoshikazu Kanazawa, all of Kawasaki, Japan

[73] Assignee: Fujitsu Limited, Kawasaki, Japan

[21] Appl. No.: 08/869,227

[22] Filed: Jun. 4, 1997

[30] Foreign Application Priority Data

Nov. 27, 1996 [JP] Japan .................................... 8-316537

[51] Int. Cl.[7] .............................. G09G 3/28; G09G 3/36; G09C 5/00

[52] U.S. Cl. .............................. 345/94; 345/60; 345/208; 315/169.2

[58] Field of Search ................................ 345/94, 202, 98, 345/189, 208, 213, 507, 509, 515–516, 60; 395/595, 588; 712/220, 201, 102, 100, 2; 315/169.2

[56] References Cited

U.S. PATENT DOCUMENTS

| | | | |
|---|---|---|---|
| 3,851,211 | 11/1974 | Greeson, Jr. . | |
| 3,936,808 | 2/1976 | O'Neill, Jr. | 345/507 |
| 4,499,460 | 2/1985 | Person et al. . | |
| 4,727,570 | 2/1988 | Tarbouriech . | |
| 4,819,186 | 4/1989 | Ohta et al. . | |
| 5,068,651 | 11/1991 | Takebe et al. | 345/213 |
| 5,670,993 | 9/1997 | Greene et al. | 345/189 |
| 5,680,600 | 10/1997 | Childers et al. | 395/595 |

FOREIGN PATENT DOCUMENTS

| | | |
|---|---|---|
| 4-284491 | 10/1992 | Japan . |
| 2 102 178 | 1/1983 | United Kingdom . |

*Primary Examiner*—Bipin Shalwala
*Assistant Examiner*—David L. Lewis
*Attorney, Agent, or Firm*—Staas & Halsey LLP

[57] ABSTRACT

A wave generation circuit is disclosed, in which a complex waveform can be generated without increasing the ROM data amount or increasing the reading rate. Waveform data relating to a waveform and the generation thereof are stored in a ROM for each cycle. An address signal for reading the waveform data sequentially is produced sequentially by an address generation circuit. The waveform data read out are sequentially reproduced into a waveform signal by a waveform data output circuit. In a wave generating circuit including the ROM and the address generation circuit, the waveform data includes the extension information instructing to extend and reproduce the waveform data for a particular cycle. An extension and control circuit included in the wave generation circuit decides on the presence or absence of the extension information from the read waveform data, and in the presence of the extension information, controls the waveform data output circuit to maintain the output of a corresponding waveform signal while at the same time controlling the address generation circuit to retard the generation of the address signal. The wave generation circuit can generate a single waveform data in an extended form according to the extension information when the same data continues for a plurality of cycles, thereby reducing the waveform data amount and the ROM capacity.

8 Claims, 37 Drawing Sheets

WAVE GENERATION CIRCUIT FOR READING ROM DATA AND GENERATING WAVE SIGNALS AND FLAT MATRIX DISPLAY APPARATUS USING THE SAME CIRCUIT

BACKGROUND OF THE INVENTION

1. Field of the Invention

The present invention relates to a wave generation circuit and a flat matrix display apparatus such as a plasma display panel (PDP) display apparatus including a drive signal generation section having such a wave generation circuit or, in particular, to a wave generation circuit including a ROM for storing data relating to a waveform and the generation thereof, sequentially reading and converting the stored data into a waveform and a flat matrix display apparatus having such a circuit.

2. Description of the Related Art

In recent years, a flat matrix display apparatus using a PDP or LCD, which can be easily reduced in thickness, has come to be used in place of a CRT. Especially, the PDP display apparatus involves a simple process, can be easily increased in size, can emit light for a high display quality, and is fast in response. Due to these reasons, the PDP display apparatus has rapidly found wide applications and has seen an increased production volume. Demand is also high for a color display in these flat matrix display apparatuses. A full-color PDP display apparatus requires a fine control of the drive waveform of a display panel drive circuit. In the PDP display apparatus, the drive waveform is normally controlled on the basis of the signal generated from a wave generation circuit. A wave generation circuit, in which the data representing a signal associated with a waveform and the control thereof are stored in a ROM for each basic period of wave generation, is widely used and the data thus stored in the ROM are sequentially read out to generate a waveform. In the case where a required data amount cannot be obtained from each reading session, the data stored for the basic period is divided into a plurality of portions, so that the data are read a plurality of times for each basic period to output the required amount of data. The present applicant has disclosed a drive wave generation circuit for the PDP display apparatus having such a configuration in JP-A-4-284491.

The drive wave generation circuit for the PDP display apparatus includes a ROM for storing a drive waveform and a control signal corresponding to one subframe. If the drive waveform and the control signal corresponding to one subframe are to be stored as data in its entirety, a ROM of a large capacity would be required. For the portions where the same waveform is repeated, therefore, a predetermined address range is repeatedly read to generate the same waveform repeatedly. Also, in the case where the number of bits in the ROM is smaller than the one required to form a unit of waveform data, the ROM data is read a plurality of times to generate a unit of waveform data.

In the PDP display apparatus, in order to further improve the display quality and the durability, the drive of the panel by each driver is required to be controlled more finely. This in turn requires a finer drive waveform supplied to each driver. For the drive waveform to be finer, however, it is necessary to increase the capacity of the ROM for storing the data of the drive waveform and the control signal on the one hand and to increase the amount of the data read from the ROM within a basic period on the other hand. This indicates an increased rate at which the data is read from the ROM. An increased rate of reading the data from the ROM requires the use of a ROM of higher speed and gives rise to the problem of an increased ROM cost. For these reasons, a fine drive waveform for the PDP display apparatus has so far not been obtained easily.

The PDP display apparatus also sometimes requires that the operation is omitted for a part of a subframe and the next process is performed. In the conventional wave generation circuit, however, all that could be done was to change the addresses sequentially or to repeat a predetermined address range, but not to skip a given address to another address in reading the ROM in compliance with an external request.

All these inconveniences are not limited to the wave generation circuit used in the PDP display apparatus, but apply equally to the wave generation circuits for other applications, in which generation of a finer waveform or deformation of a waveform poses a similar problem.

SUMMARY OF THE INVENTION

An object of the present invention is to solve the above-mentioned problems and to provide a wave generation circuit that can generate a complex waveform without increasing the rate at which the data is read from a ROM or the amount of the data stored in a ROM and to make a finer drive waveform possible without increasing the cost of the wave generation circuit of the PDP display apparatus using the above-mentioned wave generation circuit.

According to one aspect of the present invention, there is provided a wave generation circuit comprising a ROM for storing waveform data associated with a waveform and the generation thereof for each cycle, an address generation circuit for sequentially generating address signals for reading the waveform data sequentially, and a waveform data output circuit for sequentially reproducing the read waveform data into signals, wherein the waveform data include extension information for instructions to extend and reproduce the waveform data for a particular cycle, the apparatus further comprising an extension decision and control circuit for deciding on the presence or absence of the extension information in the waveform data read out and, in the presence of the extension information, controlling the waveform data output circuit to maintain a corresponding waveform signal output and also the address generation circuit to retard the operation of generating an address signal.

With a conventional wave generation circuit, even in the case where the same status continues for a plurality of cycles, the same data is stored in the ROM for each cycle and sequentially read out. The result was that the same waveform data has been generated successively. According to the present invention, on the other hand, in the case where the same data occurs for a plurality of successive cycles, a single waveform data is produced in extension by means of the extension information, and therefore the amount of the waveform data can be reduced for a correspondingly lower capacity of the ROM. Also, in the case where the same waveform is repeated, the conventional wave generation circuit is such that a basic waveform is stored in the ROM and the address range thereof is repeatedly read out to reduce the ROM capacity. The conventional wave generation circuit, however, repeatedly reads out a given address range in which the waveform data is stored for a plurality of cycles constituting a periodically-changing waveform portion. According to this invention, in contrast, the waveform data for a given cycle is directly extended and reproduced.

Although the period of extension may be fixed, the extension period information indicative of the period of extension may be included in the waveform data together with the extension information indicating the advisability of extending the waveform data. As a result, an arbitrary extension period can be set. Once the length of the waveform in a given status can be set arbitrarily, a finer drive waveform can be produced.

Various methods are conceivable for including the extension information and the extension period information in the waveform data. One method consists in having the extension period information included in the waveform data of the cycle next to the extension information. Another method is to construct the extension information of a plurality of bits and to express the extension period information by a plurality of the bits for the extension information, so that a plurality of the bits are appropriately combined to indicate both the advisability of extension and the extension period.

According to a second aspect of the present invention, there is provided a wave generation circuit comprising a ROM for storing the waveform data associated with a waveform and the generation thereof for each cycle, an address generation circuit for sequentially generating address signals for sequentially reading the waveform data, and a skip decision circuit for setting a skip address in the address generation circuit and controlling the address generation circuit to continue generating the address signal from the skip address in response to an external skip instruction signal in the case where the address signal generated in the address generation circuit reaches a predetermined value.

With the wave generation circuit according to the second aspect of the invention, a predetermined address can be skipped to the desired address. In addition, the advisability of skipping an address can be determined in accordance with an external instruction signal and therefore, the waveform can be altered according to the prevailing conditions.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Before proceeding to a detailed description of the preferred embodiments of the present invention, a conventional plasma display apparatus and its wave generation circuit will be described to allow a clearer understanding of the differences between the present invention and a prior art.

Figure 1:
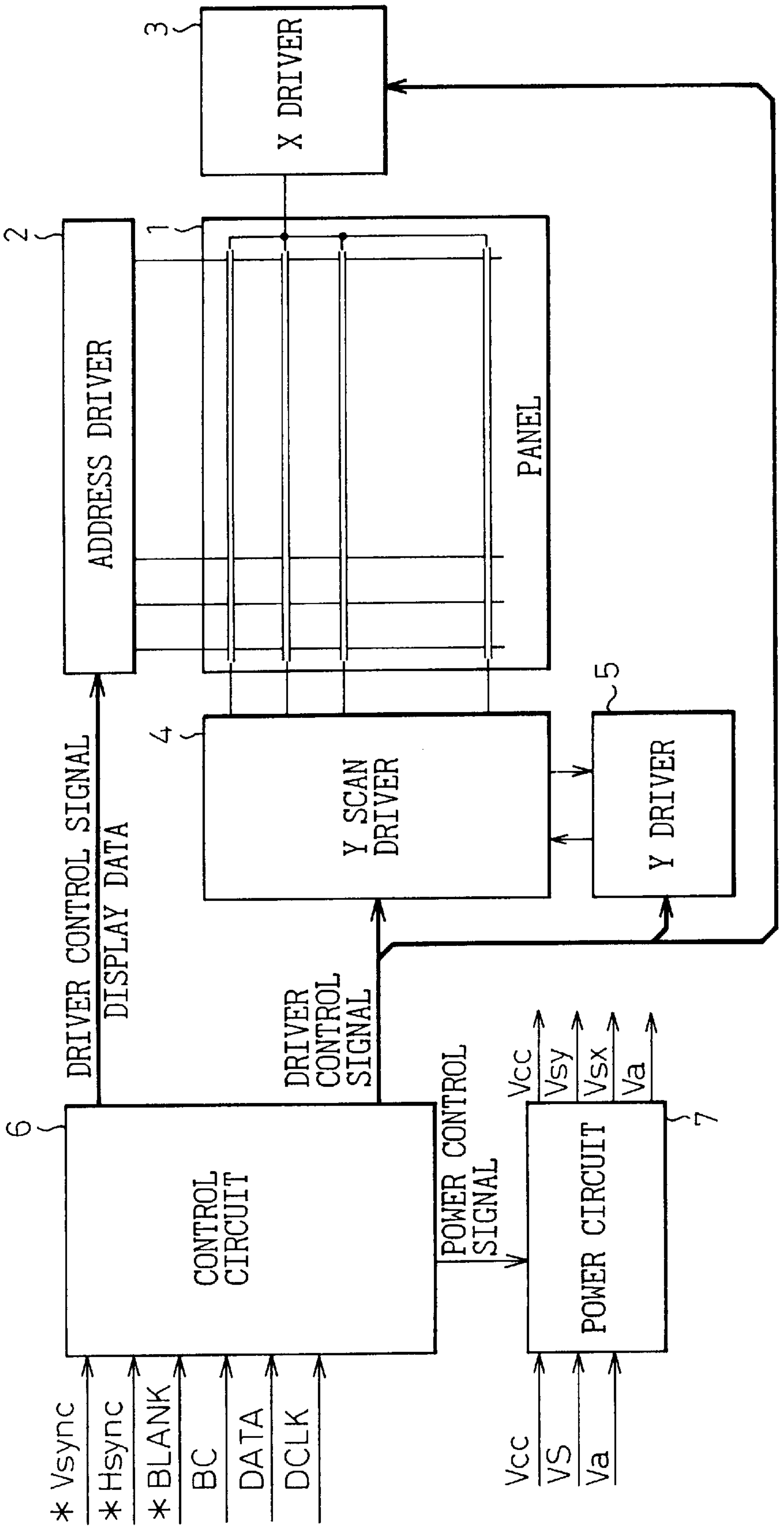
FIG. 1 is a diagram showing a general configuration of a three-electrode flat discharge color plasma display apparatus.
Figure 2:
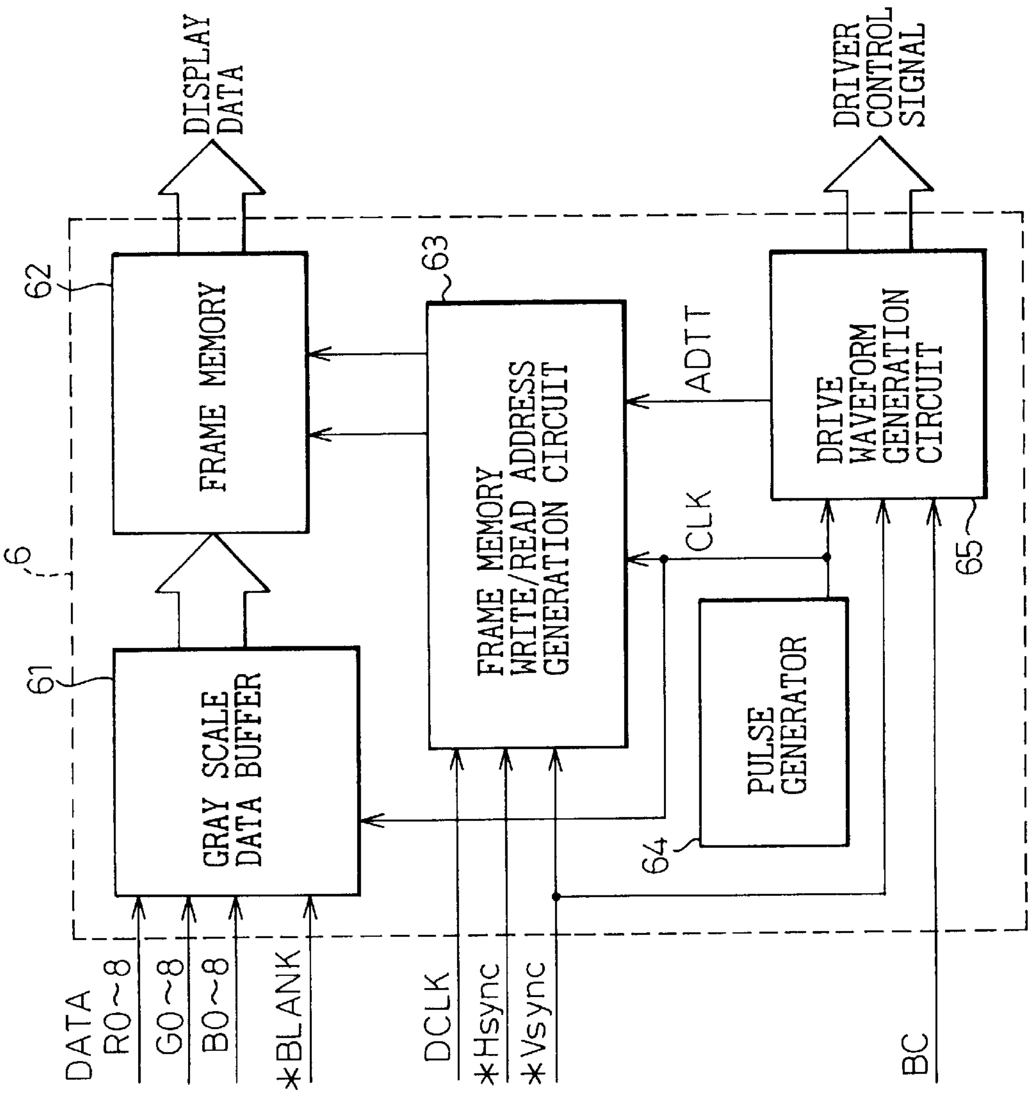
FIG. 2 is a block diagram showing the configuration of a control circuit of a color plasma display apparatus.
Figure 3:
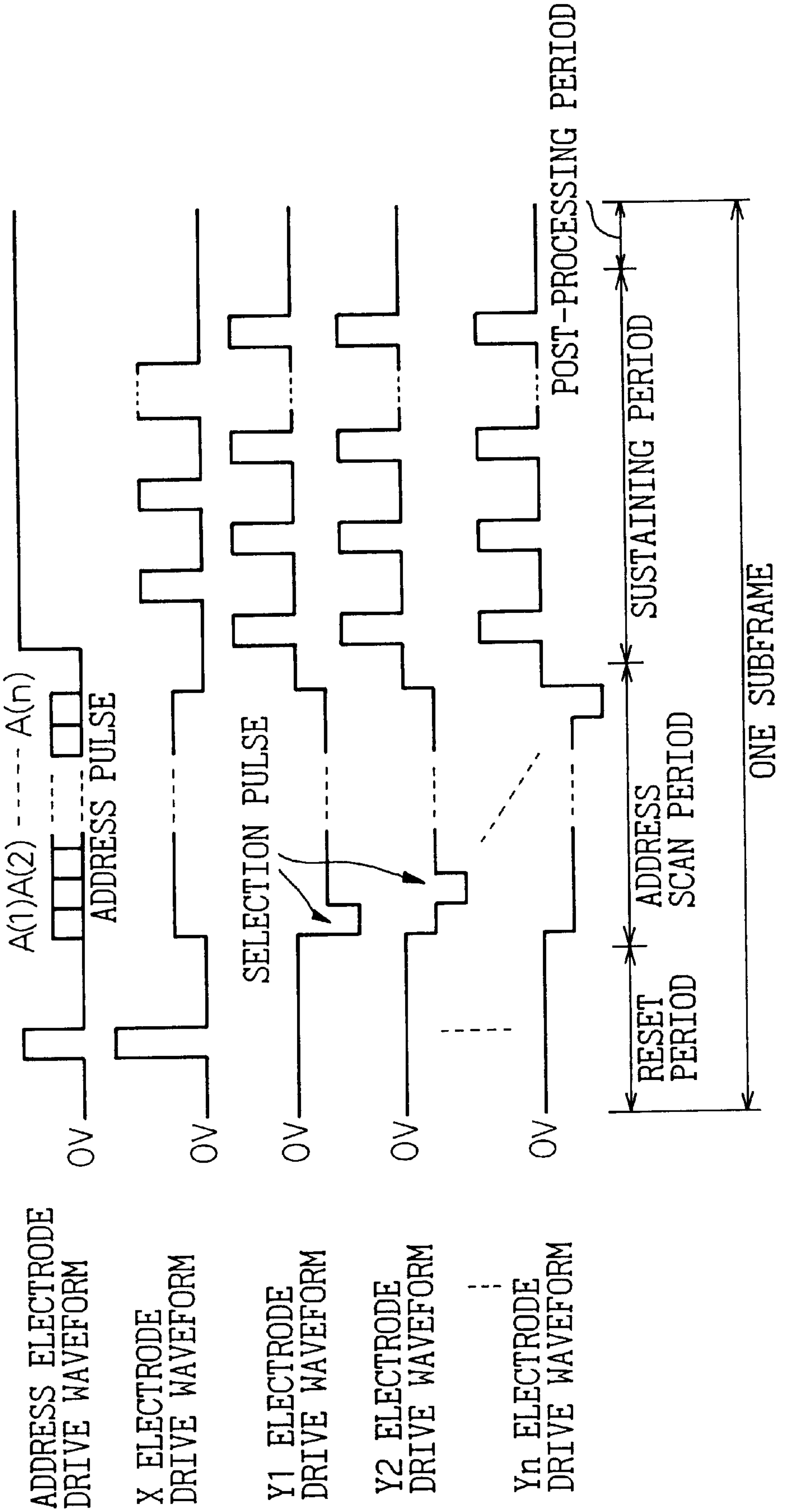
FIG. 3 is a time chart showing a drive waveform of a plasma display apparatus.
Figure 4:
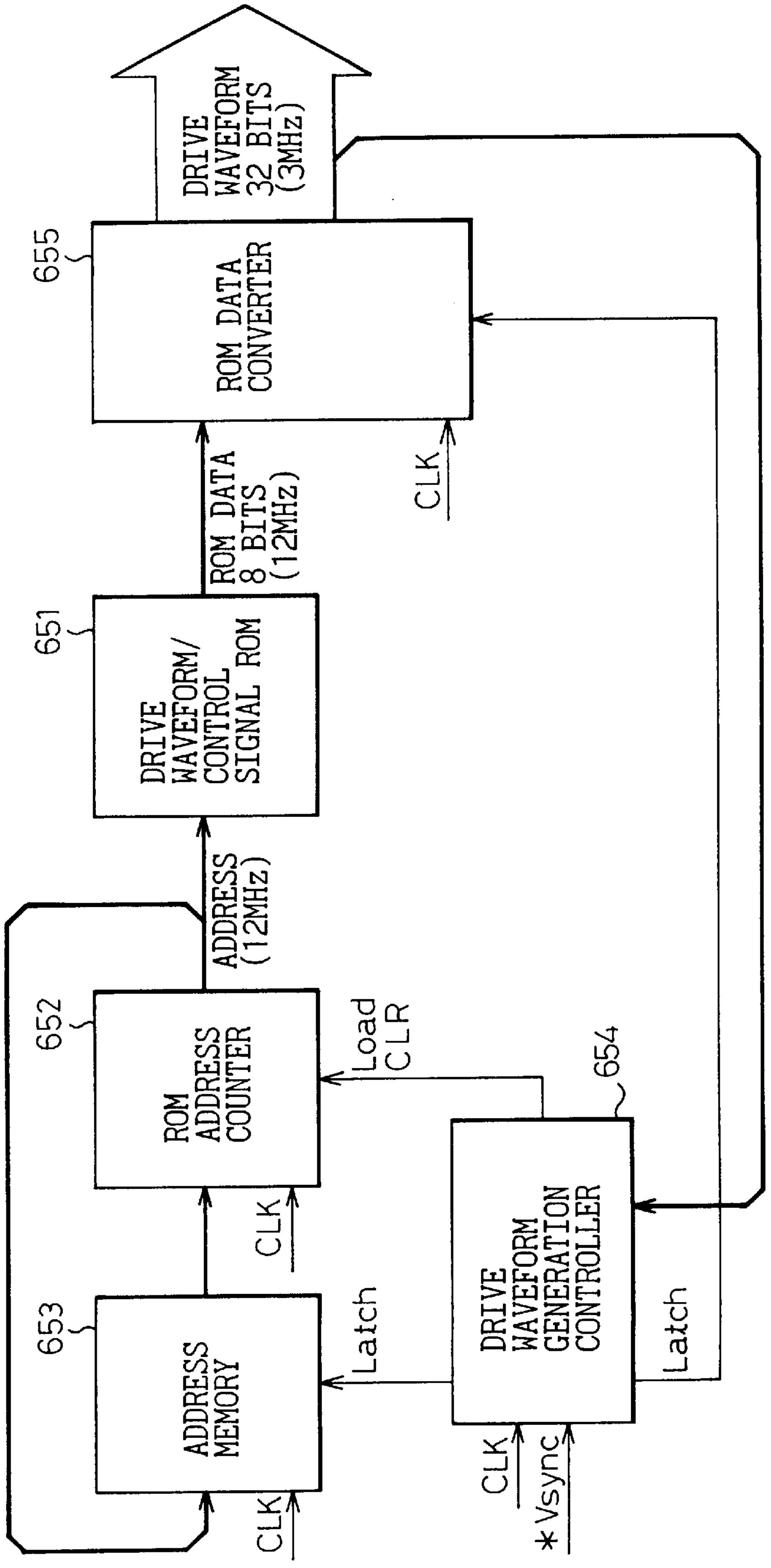
FIG. 4 is a block diagram showing the configuration of a conventional drive wave generation circuit.

FIG. 1 is a diagram showing a general configuration of a three-electrode flat discharge color PDP apparatus, FIG. 2 is a block diagram showing a configuration of a control circuit, FIG. 3 a time chart showing an example of drive waveforms, and FIG. 4 a block diagram showing a configuration of a drive wave generation circuit. A drive wave generation circuit of a conventional color PDP display apparatus will be briefly explained with reference to FIGS. 1 to 4.

As shown in FIG. 1, a PDP display apparatus comprises a panel 1, a Y scan driver 4 for sequentially applying scan pulses to the Y scan electrodes of the panel 1, an address driver 2 for applying a drive signal in synchronism with the scan pulse to the address electrode corresponding to a turned-on cell of the panel 1, an X driver 3 and a Y driver 5 for applying a sustaining waveform between a common X electrode and all the Y scan electrodes of the panel 1, a power circuit 7 for supplying voltages Vsy, Vsx and Va to the drivers 2 to 5, respectively, and a control circuit 6 for applying a display data and a driver control signal to the address driver 2, a driver control signal to the other drivers 3 to 5 and a power control signal to the power circuit 7.

As shown in FIG. 2, the control circuit 6 includes a gray scale data buffer 61, a frame memory 62, a frame memory write/read address generation circuit 63, a pulse generator 64 and a drive wave generation circuit 65.

FIG. 3 is a diagram showing drive signals generated by the control circuit 6. The uppermost signal in FIG. 3 is applied to the address electrode from the address driver 2, the second uppermost signal is applied from the X driver 3 to the X electrode, and the third uppermost and subsequent signals are applied to the Y electrodes from the Y scan driver 4 and the Y driver 5. In FIG. 3, the signals A(1), A(2), . . . , A(n) applied to the address electrode during the address period represent display data, and the remaining signals are generated by the drive wave generation circuit 65.

A circuit like the drive wave generation circuit 65 for generating a wave is widely used. In this circuit data indicating signals associated with a waveform and the control thereof are stored in a ROM for each basic period of wave generation, and the data stored in the ROM are sequentially read to generate a wave. In the case where a required data amount cannot be obtained in a single read session, the data for each basic period are stored in a plurality of divided portions so that the required amount of data is output by reading a plurality of times for each basic period.

As described above, the present applicant has disclosed in JP-A-4-284491 a drive wave generation circuit for the PDP display apparatus. FIG. 4 is a diagram showing an example configuration of a conventional drive wave generation circuit 65 disclosed in the above-mentioned patent publication. As shown in FIG. 4, the conventional drive wave generation circuit 65 comprises a drive wave/control signal ROM 651, a ROM address counter 652, an address memory circuit 653, a ROM data conversion circuit 655, and a drive wave generation control circuit 654 for applying a control signal to the ROM address counter 652, the address memory circuit 653 and the ROM data conversion circuit 655.

Figure 5:
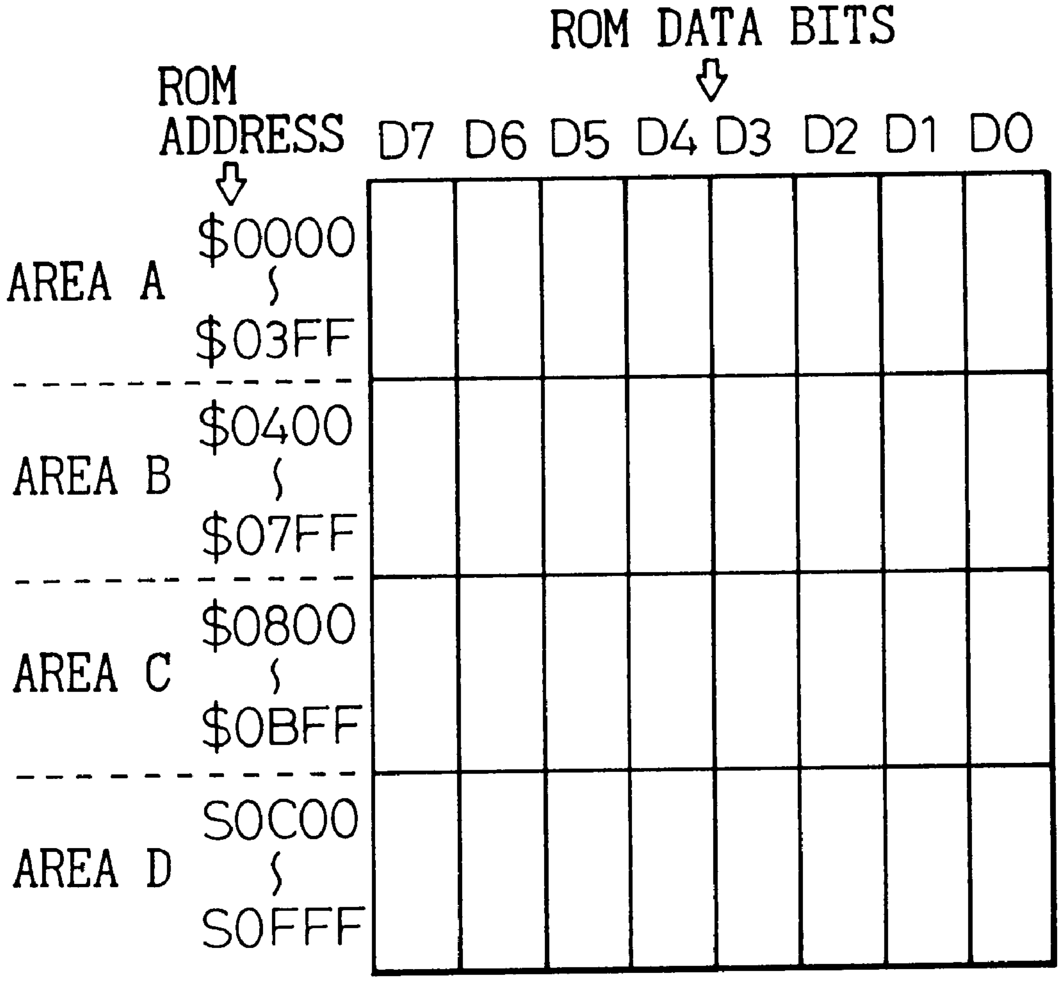
FIG. 5 is a diagram showing a conventional ROM memory map.

The PDP display apparatus is generally driven for gray scale display by a multiplex address method in which one display frame is divided into a plurality of subframes, and the sustaining period (sustained discharge period) for determining an effective luminance of each subframe is set to a ratio of 1:2:4:8:16 and so forth, so that the gray scale data are displayed in subframes by weighting. In this method, the drive wave/control signal ROM 651 has stored therein a drive waveform for one subframe and a control signal applied to the drive wave generation control circuit 654. The length of the sustaining period is defined by the number of repetitions of the repetitive portions described later. As shown in FIG. 3, one subframe is divided into a reset period, an address period, a sustaining period and a post-processing period. If the drive waveforms and the control signals for one subframe are all stored as data, a drive wave/control signal ROM 651 of a large storage capacity would be required. For the portions where the same waveform is repeated, therefore, a predetermined address range is repeatedly read out to generate the same waveform repeatedly. In the drive signals shown in FIG. 3, the same waveform is repeated during the address period and the sustaining period. Therefore, only a minimum unit of repetitive cycles is stored for this portion. The data stored in the drive wave/control signal ROM 651 holds a head address storing the data corresponding to the minimum unit of the repetitive cycles of the drive waveform output from the ROM address counter 652 in the address memory circuit 653 during the repetitive cycles of the drive waveform. In the case where the drive wave/control signal ROM 651 is 8 bits, the 8-bit data is insufficient for generating the required drive wave. The data thus is converted into eight bits or more by the ROM data conversion circuit 655. Assume, for example, that the required drive wave is 32 bits and the control signal data are required to be generated in a 3-MHz period. Data are stored in a memory map as shown in FIG. 5 in the drive wave/control signal ROM 651 having an 8-bit data width, so that the regions, A, B, C and D are sequentially read at 12 MHz, and the data thus read are converted into 32-bit 3-MHz data in each four read sessions by the ROM data conversion circuit 655. The ROM data output from the ROM data conversion means 655 are applied as a driver control signal to each of the address driver 2, the X driver 3, the Y scan driver 4 and the Y driver 5 except that the control signal and the control signal ADDT for the frame memory write/read address generation circuit are applied to the drive wave generation control means 654. Each driver includes a circuit for generating a predetermined voltage signal applied to each electrode according to the control signal supplied thereto. A signal as shown in FIG. 3 is generated to drive the panel 1. The above-mentioned operation is repeated a number of times equivalent to the number of subframe portions to thereby complete the display of one screen.

In the PDP display apparatus, the drive of the panel is required to be controlled more finely by each driver in order to further improve the display quality and the durability. For this purpose, the drive waveform applied to each driver is also required to be finer. For the drive waveform to be finer, however, it is necessary to increase the capacity of the drive wave/control signal ROM 651 as well as the data amount read from the drive wave/control signal ROM 651 within a basic period. This is indicative of the need of an increased rate at which data are read from the ROM. An increased read rate from the ROM requires a higher-speed ROM leading to the problem of an increased ROM cost. In view of this, a fine drive waveform for the PDP display apparatus has so far been difficult to produce.

On the other hand, a PDP display apparatus uses a multiple address method in which the gray scale is displayed by displaying the gray scale data in a subframe corresponding to the weighting. In the case where the user adjusts the luminance of the screen, the length of the sustaining period of the subframe is accordingly changed. Actually, however, the sustaining period of the subframe weighted to a minimum is very short. The luminance adjustment for darkening, therefore, may cause a sustaining period of the minimum weighted subframe shorter than one cycle. In such a case, the particular minimum weighted subframe is not required to be turned on. In view of the resulting likelihood of a lighting failure for the next subframe, however, the whole of such a subframe cannot be eliminated. Therefore, the reset period, the address period and the post-processing period are implemented, but not the sustaining period. As a result, a drive waveform is required to be generated, in which the post-processing period immediately follows the address period. In the conventional wave generation circuit, however, only the address is changed sequentially or a predetermined address range is repeated. The read operation of the ROM cannot be skipped from a given address to another distant address in compliance with an external request. Consequently, the elimination of the sustaining period described above is impossible for the prior art.

All the above-mentioned facts are not exclusive to the wave generation circuit used with the PDP display apparatus, but the same can be said of the wave generation circuits in other applications as well, which is a problem posed in generating a fine wave or deforming a waveform.

The present invention has been developed in view of the above-mentioned problems, and an object of the present invention is to provide a wave generation circuit capable of generatina without increasing the ROM data amount or the read rate thereof, while at the same time making a finer drive waveform possible without increasing the cost of the wave generation circuit portion of the PDP display apparatus by using the above-mentioned wave generation circuit.

Figure 6:
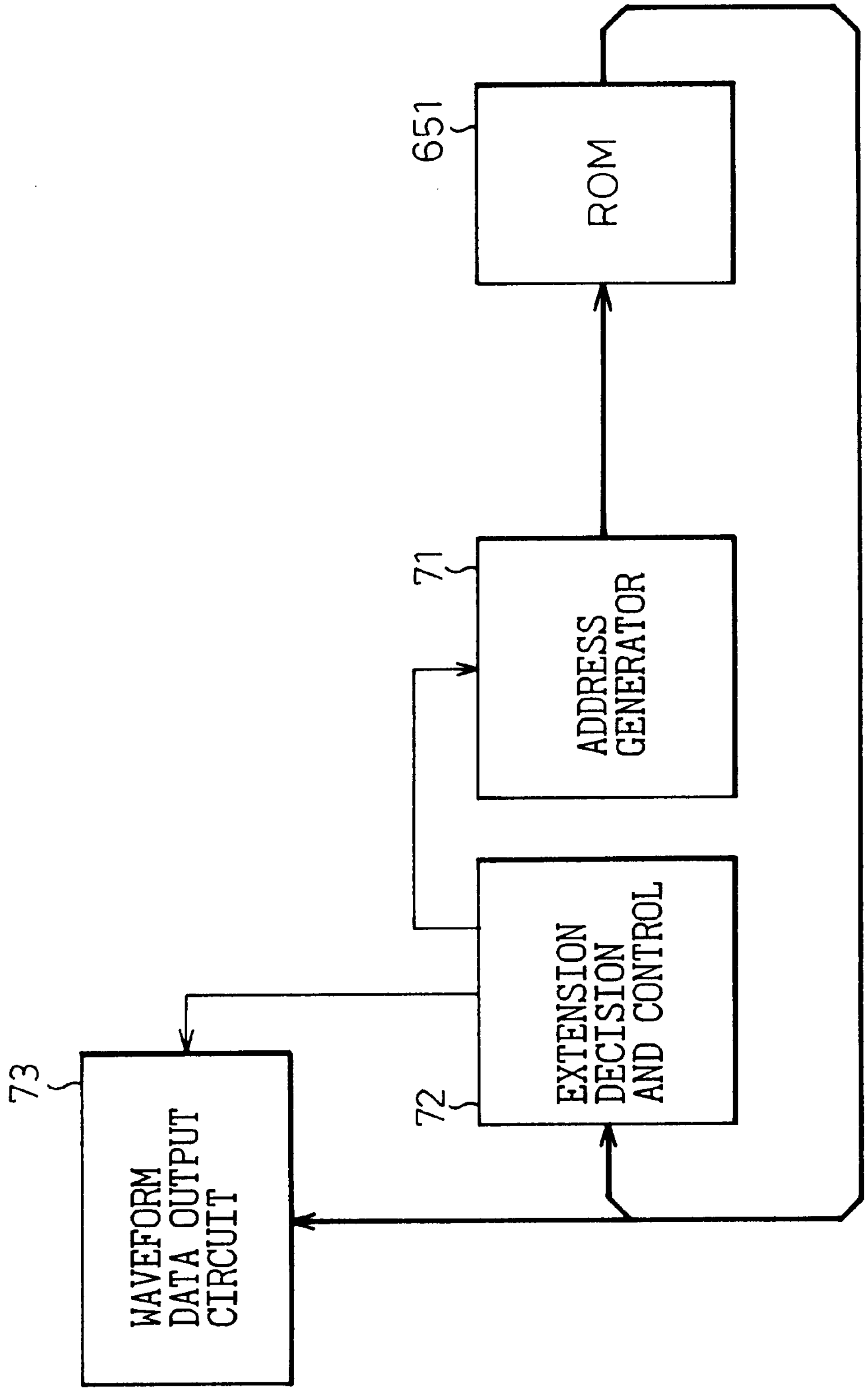
FIG. 6 is a diagram showing a basic configuration of the apparatus according to a first aspect of the invention.

FIG. 6 is a diagram showing a basic configuration of a wave generation circuit according to one aspect of the invention.

As shown in FIG. 6, a wave generation circuit according to the present invention comprises a ROM 651 for storing waveform data associated with a waveform and the generation thereof for each cycle, an address generation circuit 71 for sequentially generating address signals for reading the waveform data sequentially, and a waveform data output circuit 73 for sequentially reproducing waveform signals from the waveform read, wherein the waveform data includes extension information for instructing to reproduce an extended waveform data for a particular cycle, the apparatus further comprising an extension decision and control circuit for deciding on the presence or absence of the extension information in the waveform data read out, and in the presence of the extension information, controlling the waveform data output circuit 73 to maintain a corresponding waveform signal output and also the address generation circuit 71 to retard the operation of generating an address signal.

With the conventional wave generation circuit, even in the case where the same status continues to be assumed in a plurality of successive cycles, the same data is stored in ROM for each cycle and sequentially read. The result is the phenomenon of successive generation of the same waveform data. According to this invention, in contrast, in the case where the same data is generated in a plurality of successive cycles, a single waveform data can be generated in extension by means of the extension information, and therefore the amount of the waveform data can be reduced for a correspondingly smaller ROM capacity.

As described above, in the case where the same waveform is repeated, the conventional wave generation circuit stores a basic waveform in a ROM ahd repeatedly reads out the address range thereof to reduce the ROM capacity. Unlike the conventional wave generation circuit in which a plurality of cycles of waveform data constituting periodically changing waveform portions are stored and the address range of the stored data are repeatedly read out, however, the present invention is such that the waveform data of a given cycle can be extended and reproduced directly.

Although the extension period may be fixed, the extension period information indicating the period of extension can be included in the waveform data together with the extension information indicating the advisability of waveform extension. As a consequence, the extension period can be set to an arbitrary length. In the case where the waveform data includes the extension information, the extension decision and control circuit 72 extracts the extension period information and controls the waveform data output circuit 73 to maintain the output of a corresponding waveform signal during the period designated by the extension period information.

Once the length of a waveform in a given status can be set arbitrarily, an even finer drive waveform can be produced.

Figure 7:
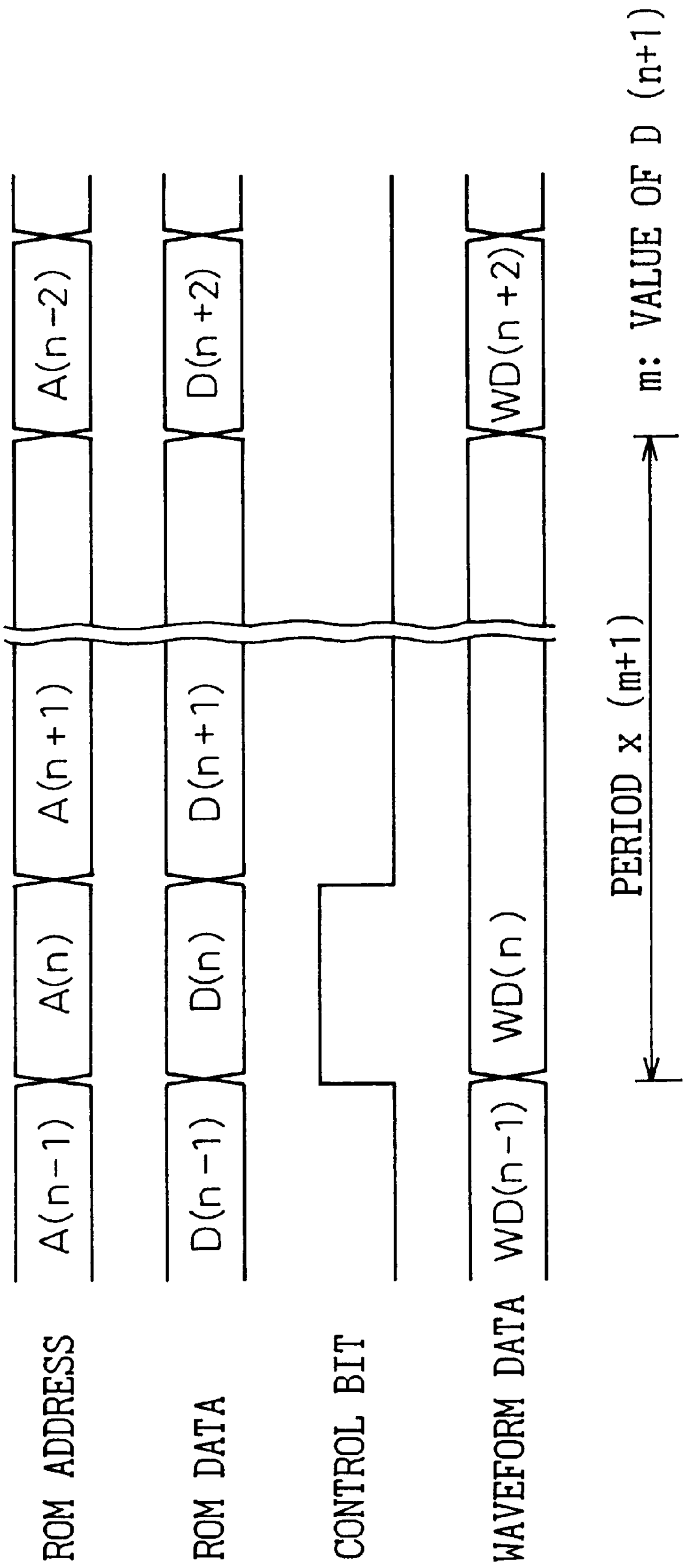
FIG. 7 is a diagram for explaining the operation of the apparatus according to the first aspect of the invention.

Various methods are conceivable for including the extension information and the extension period information in the waveform data. One method consists in having the extension period information included in the waveform data for the cycle next to the extension information. FIG. 7 is a time chart for explaining the read operation for such a method. As shown in FIG. 7, in the case where the waveform data D(n) read out contains the extension information (during the cycle when the control bit is in H state), the extension decision and control circuit 72 controls the waveform data output circuit 73 to maintain the output of a corresponding waveform data D(n+1) and then extracts the extension period information from the waveform data D(n+1) of the next cycle. In this case, the extension period designated by the extension period information is required to be longer than one cycle (actually, a period of an integral multiple of a cycle) in order to read the extension period information. After the extension period information is read out, the waveform data output circuit 73 maintains the output and the address generation circuit 71 is controlled to retard the generation of the address signal during the period (m−1) equal to the period m designated by the extension period information less one cycle representing the period for reading the extension period information. As a result, the waveform signal WD(n) is maintained for m+1 cycles.

Figure 8:
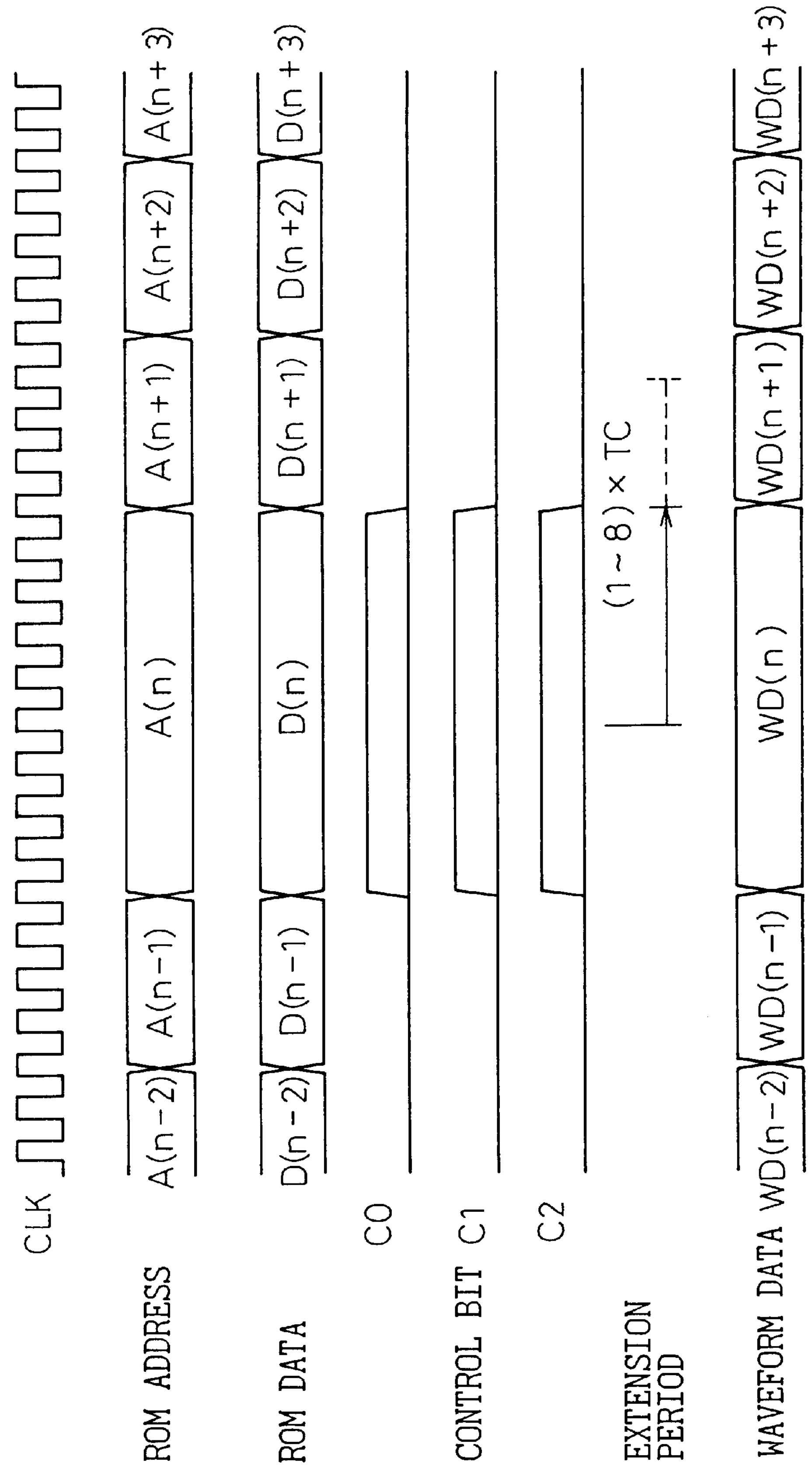
FIG. 8 is another diagram for explaining the operation of the apparatus according to the first aspect of the invention.

Another method is constructing the extension information of a plurality of bits and the extension period information also of a plurality of the same bits as the extension information, so that the advisability of extension and the extension period are determined at the same time by appropriate combinations of the bits. FIG. 8 is a time chart for explaining the read operation according to this method. Assume, for example, that three bits of the waveform data are assigned to the extension information. Eight states can be indicated by the three bits of extension information. One of the states, for example, 0 is assigned to the condition for no extension, and the other seven states to seven amounts of extension from 1 to 7. If the minimum extension amount is TC, the extension amount can be changed from TC to 7 TC. As shown in FIG. 8, each extension amount is measured by counting clocks CLK. If the period of the clocks CLK is reduced smaller than the normal cycle of the waveform data, the minimum unit of the extension period can be controlled in finer details.

Figure 9:
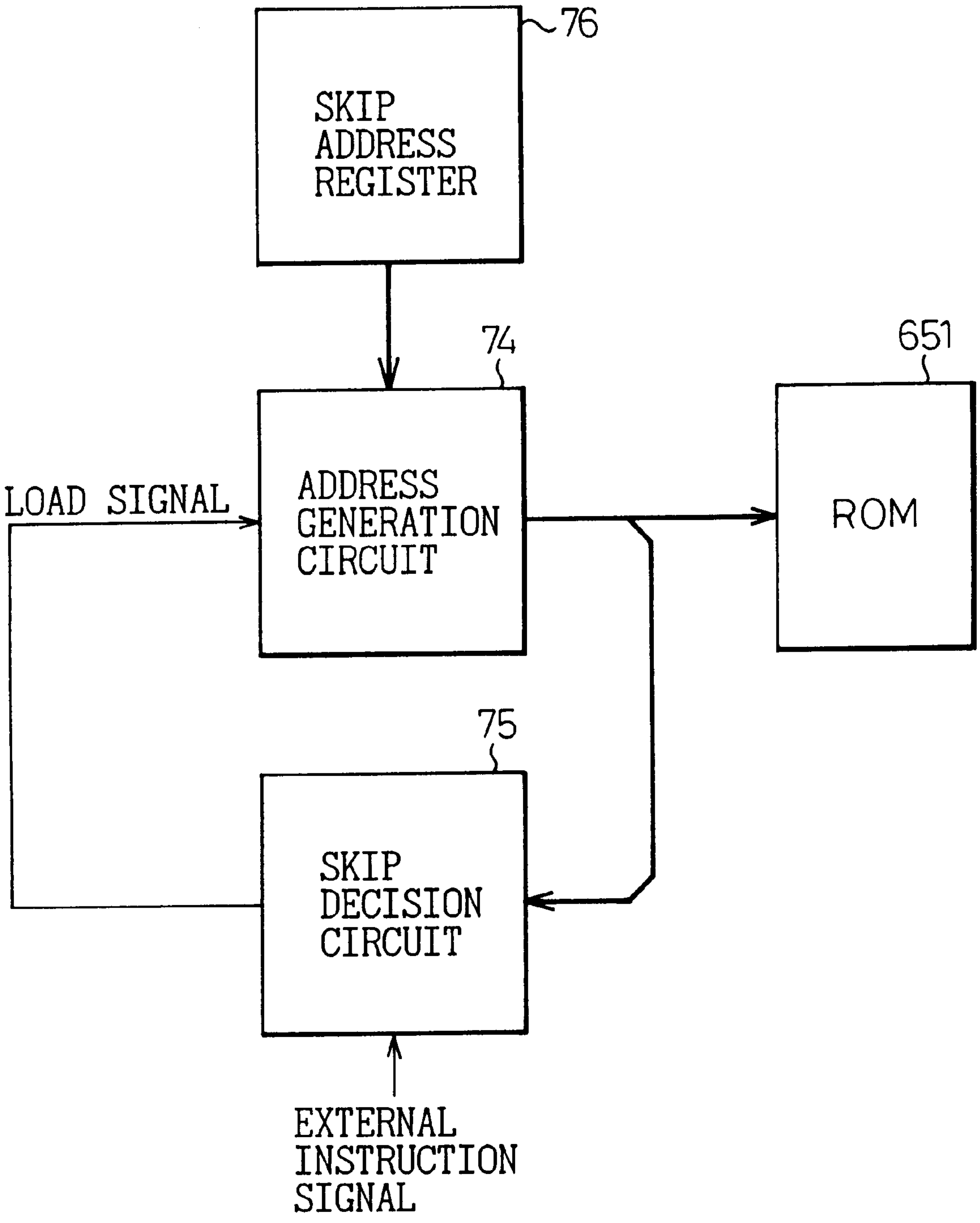
FIG. 9 is a diagram showing a basic configuration of the apparatus according to a second aspect of the invention.

FIG. 9 is a diagram showing a basic configuration of a wave generation circuit according to a second aspect of the present invention.

As shown in FIG. 9, a wave generation circuit according to this invention comprises a ROM 651 for storing the waveform data associated with the waveform and the generation thereof for each cycle, an address generation circuit 74 for sequentially generating address signals for sequentially reading the waveform data, and a skip decision circuit for setting a skip address in the address generation circuit and controlling the address generation circuit to continue generating the address signal from the skip address in response to an external skip instruction signal in the case where the address signal generated in the address generation circuit reaches a predetermined value.

According to a second aspect of the invention, it is possible to skip from a predetermined address to the desired address. Whether or not an address is skipped or not is determined according to an external instruction signal, and therefore, the waveform can be changed according to the prevailing conditions.

Figure 10:
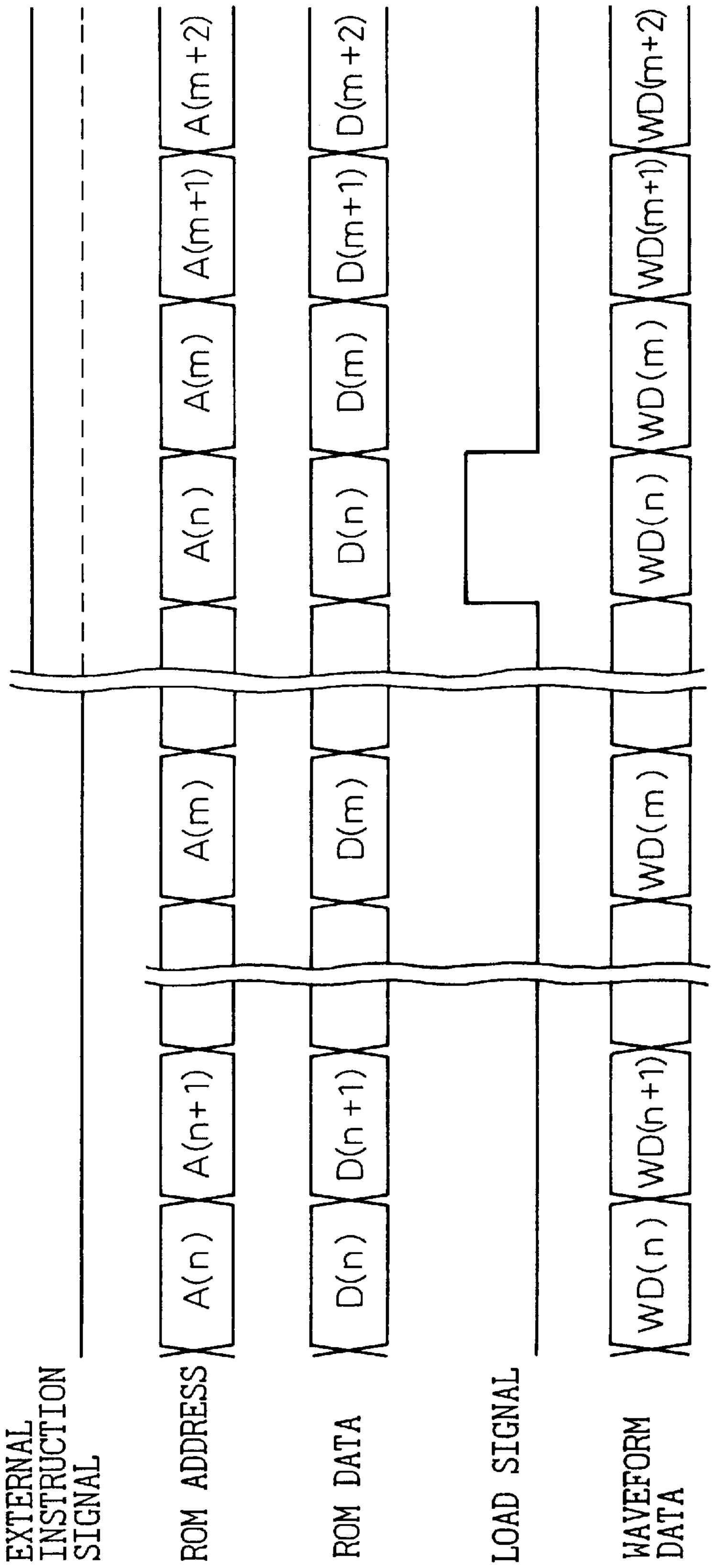
FIG. 10 is a diagram for explaining the operation of the apparatus according to the second aspect of the invention.

FIG. 10 is a time chart for explaining the read operation according to the second aspect. Assume, for example, that the skip information is contained in the data D(n) stored at address A(n) of the ROM 651 and the address A(m) is stored in the skip destination address memory circuit 76. In the case where the external instruction signal is L and is not active, the waveform is reproduced while sequentially changing the address in the case where the data D(n) is read out. In the case where the external instruction signal is H and active, by contrast, as soon as the data D(n) is read out, the skip information contained therein is detected and a load signal is turned on, so that the address A(m) stored in the skip destination address memory circuit 76 is loaded in the address generation circuit 74. The address generation circuit 74 outputs the address A(m) in the next cycle. The data D(m) is thus read out and the address generation circuit 74 subsequently changes the address sequentially from the address A(m).

Now, explanation will be made about an embodiment in which the present invention is applied to a color PDP wave generation circuit.

Figure 11:
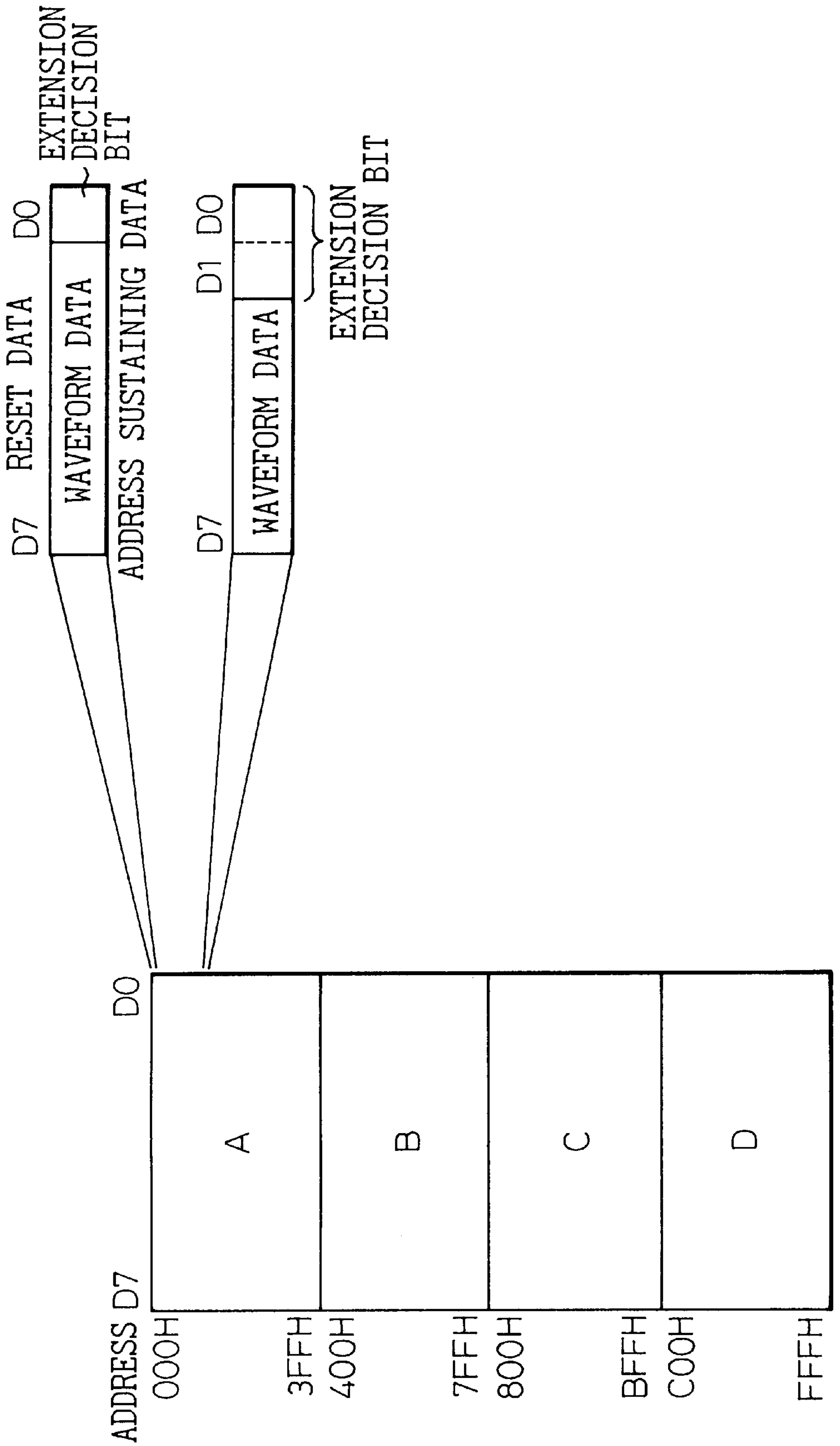
FIG. 11 is a diagram showing a ROM memory map according to an embodiment of the invention.

FIG. 11 is a diagram showing a format of the waveform data according to an embodiment of the invention. As described with reference to FIG. 5, according to this embodiment, the data bit width for the ROM is not sufficient for a cycle of waveform data. Therefore, the ROM storage area is divided into four regions of A, B, C and D, and the waveform data for each region is read sequentially four times as quickly, so that the data for the four read sessions are collectively converted into a data four times as wide. Specifically, as shown in FIG. 11, the ROM has a 12-bit address and an 8-bit data width, and is divided into four regions of A to D, each of which stores eight types of waveform data for an 8-bit output. Therefore, a total of 32 types of waveform data are stored. The data of the region A includes bits for deciding on an extension.

The PDP drive waveform during the reset period is one changing for a predetermined cycle or for each period equivalent to a multiple thereof. Consequently, with the waveform data for the reset period, an extension method is employed in which the extension period is a multiple of cycles and the data indicating the amount of extension is stored in the cycle next to the cycle storing the extension waveform data, and the first data bit D0 of the 8-bit data in region A is assigned to the extension information, whereas the data representing the extension amount is stored as an 8-bit data in region A of the next cycle. Thus, the amount that can be extended is 256 cycles at a maximum.

Also, during the address period and the sustaining period, the length of the waveform is desirably changed in fine details. For this reason, during the address period and the sustaining period, the extension amount is adjusted in units of one fourth of a cycle and two bits of the 8-bit data for region A is assigned to the extension information as described with reference to FIG. 8. When the numerical value representing the 2 bits is 0, the extension is not carried out, while when it is 1, the extension is made by one fourth of a cycle, while when the numerical representing the 2 bits is 2, on the other hand, extension is one half of a cycle. When the numerical of the 2 bits is 3, on the other hand, the waveform data is extended by ¾ cycles.

Further, as described above, the sustaining period of a minimum weighted subframe may be omitted. A skip method is employed, therefore, in which in the case where the address period switches to the sustaining period when the signal SUSO indicating the omission is H, the process is skipped to the ROM address for the post-processing period.

Figure 12:
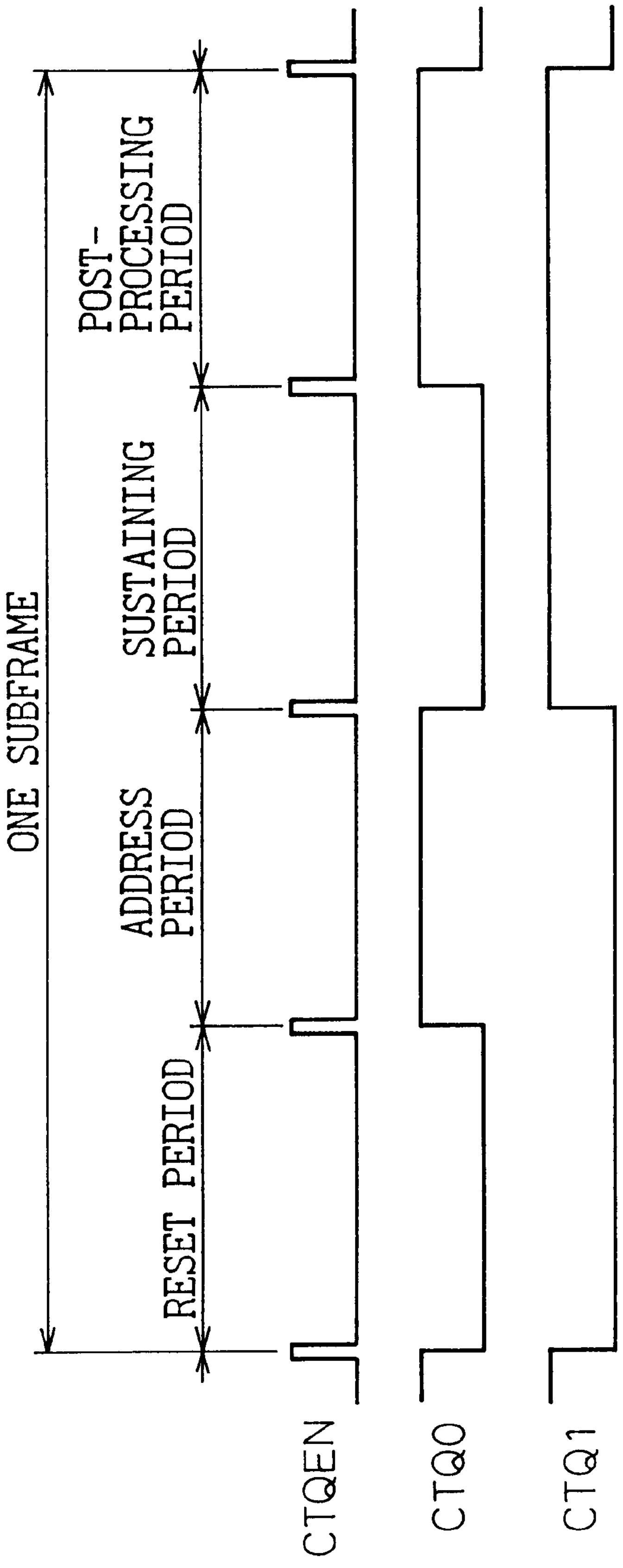
FIG. 12 is a time chart showing signals associated with the color PDP drive sequence according to an embodiment of the invention.

FIG. 12 is a diagram showing a drive sequence of the color PDP. Each time the address generated by the address generating circuit assumes a value representing the end of the reset period, the address period, the sustaining period and the post-processing period of the color PDP, the pulse of the signal CTQEN is generated, so that the signals CTQ0 and the CTQ1 undergo a change as shown. Therefore, the value of the signal CTQ0 can be appropriately combined with the value of the signal CTQ1 to determine a period involved. Specifically, when the values of the signals CTQ0 and CTQ1 are 0 and 0, respectively, the reset period is involved. When the values of the signals CTQ0 and CTP1 are 1 and 0, on the other hand, an address period is indicated. Also, the values 0 and 0 indicate a sustaining period, and the values 1 and 1 of the signals CTQ0 and CTQ1, respectively, represent a post-processing time.

Figure 13:
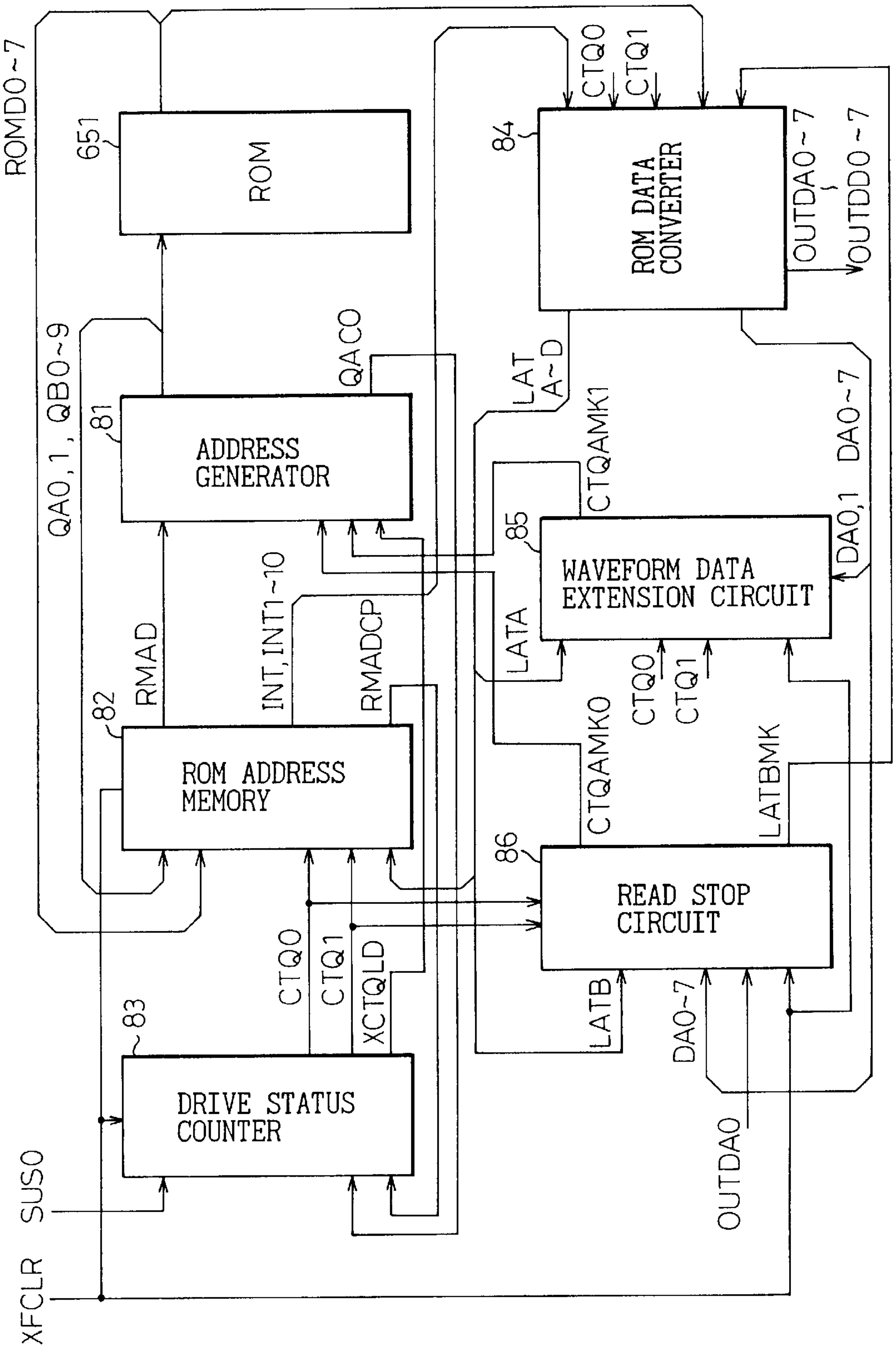
FIG. 13 is a block diagram showing a general configuration of a wave generation circuit according to an embodiment of the invention.
Figure 14:
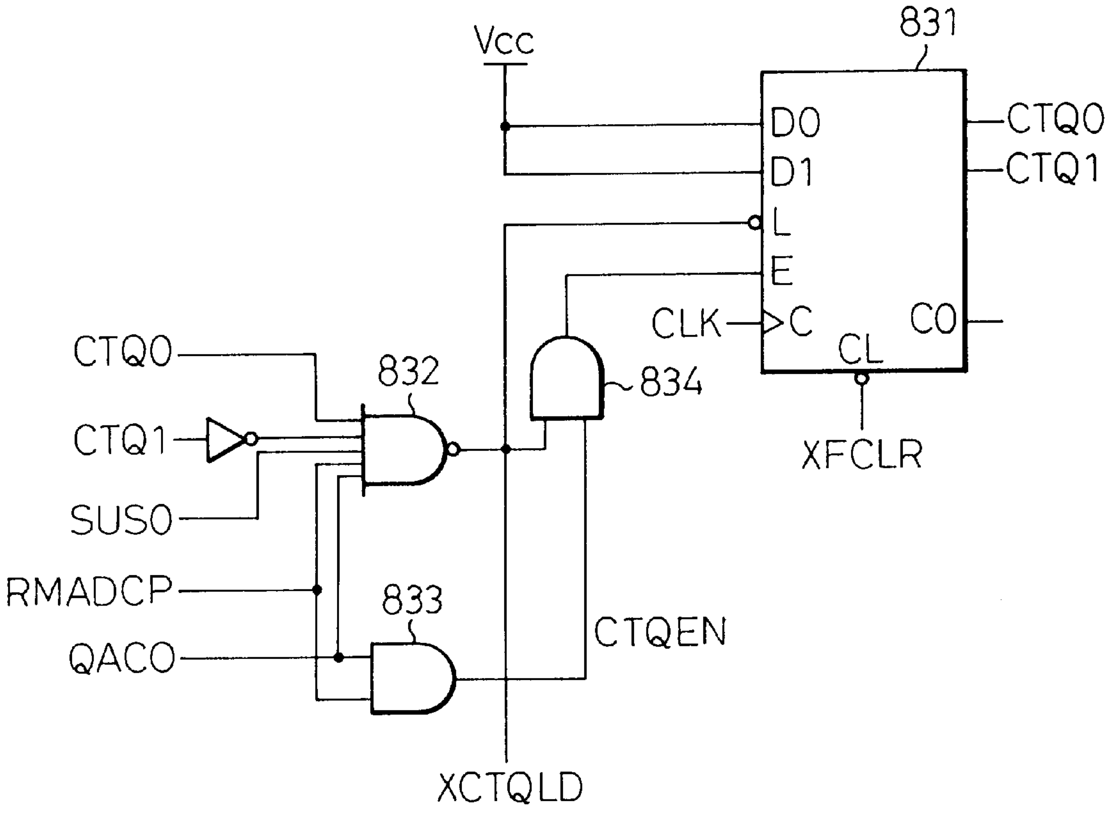
FIG. 14 is a diagram showing a circuit configuration of a drive counter according to an embodiment of the invention.
Figure 15:
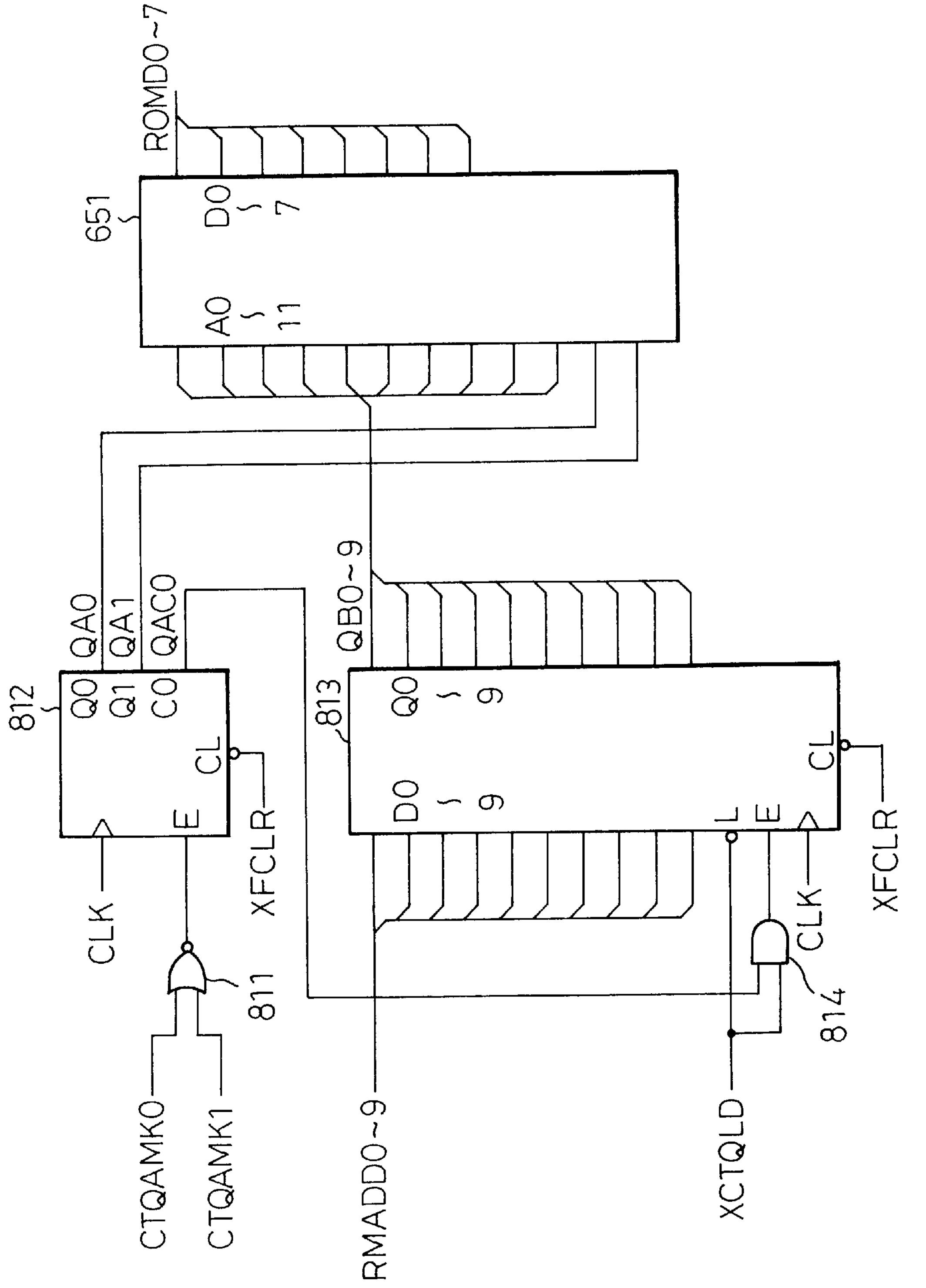
FIG. 15 is a diagram showing a circuit configuration of an address generation circuit and a ROM according to an embodiment.
Figure 17:
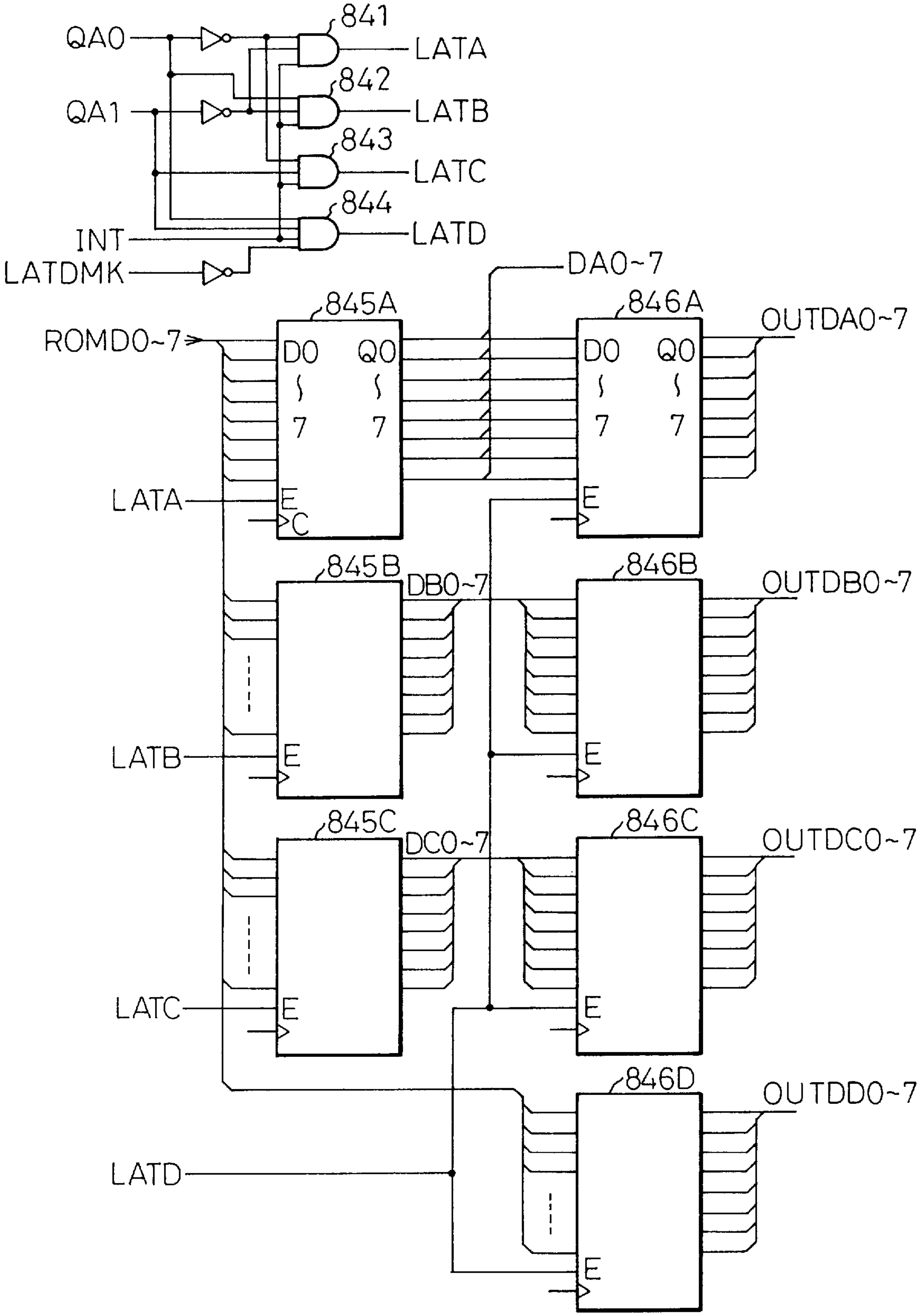
FIG. 17 is a diagram showing a configuration of a ROM data conversion circuit according to an embodiment.
Figure 18:
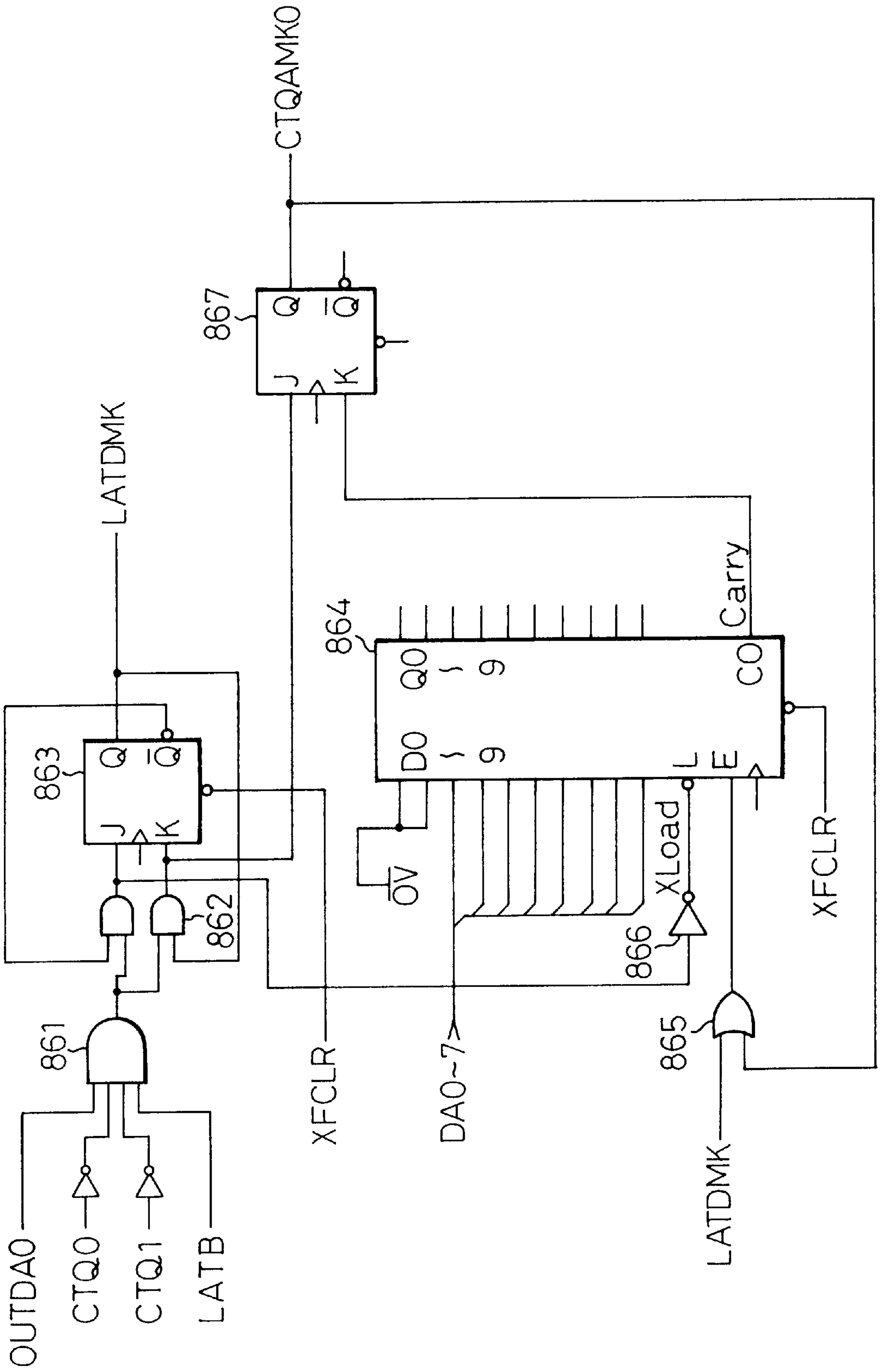
FIG. 18 is a diagram showing a configuration of a read stop circuit according to an embodiment.
Figure 19:
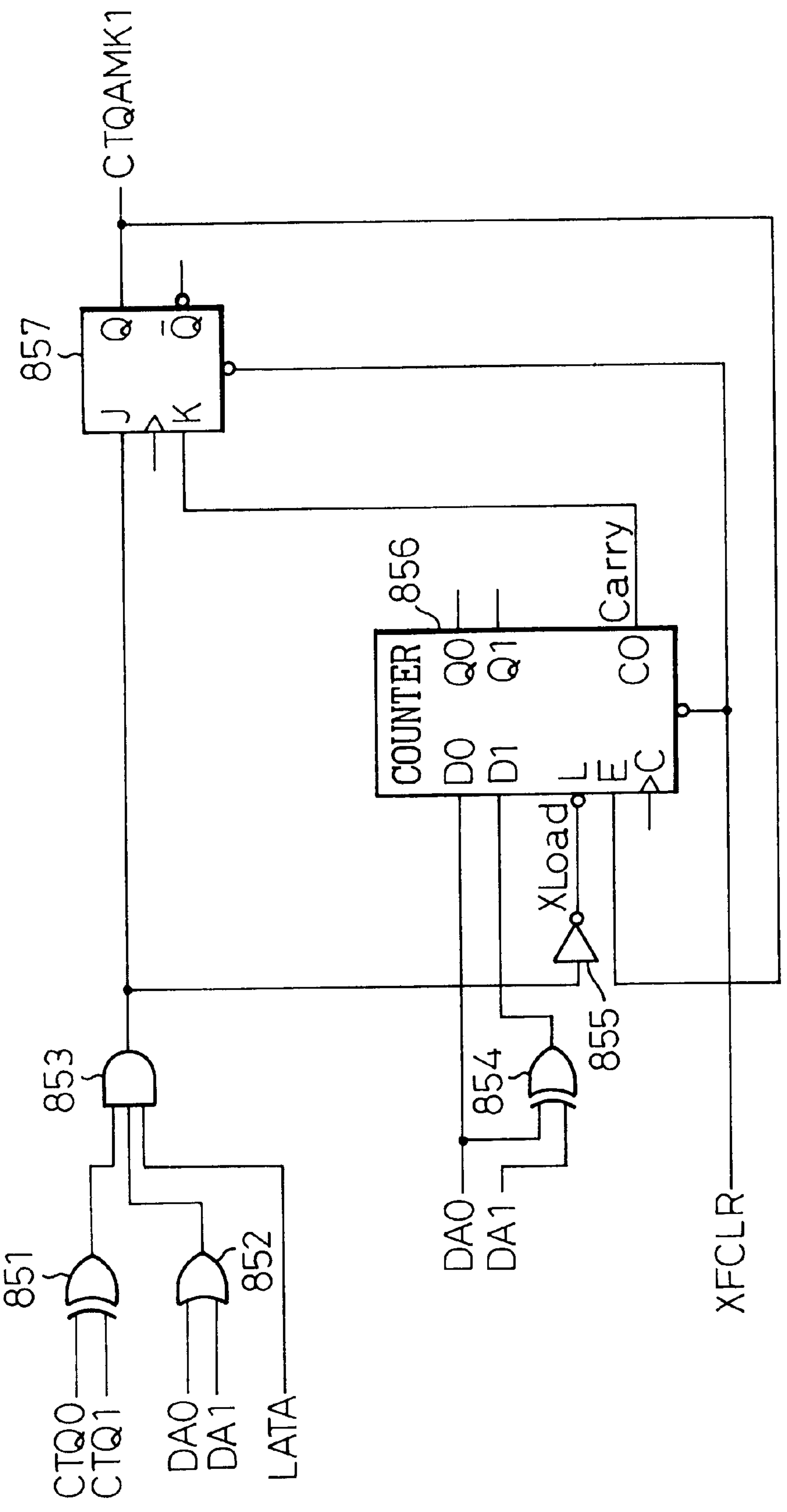
FIG. 19 is a diagram showing a configuration of a waveform data extension circuit according to an embodiment.

FIG. 13 is a diagram showing a general configuration of a wave generation circuit according to an embodiment of the invention. As shown, the wave generation circuit comprises a ROM 651, an address generation circuit 81, a ROM address memory circuit 82, a drive state counter 83, a ROM data conversion circuit 84, a waveform data extension circuit 85 and a read stop circuit 86. A specific configuration of each circuit is shown in FIGS. 14 to 19, in which FIG. 14 shows the drive state counter 83, FIG. 15 shows the address generation circuit 81 and the ROM 651, FIGS. 16A to FIG. 16C shows the ROM address memory circuit 82, FIG. 17 shows the ROM data conversion circuit 84, FIG. 18 shows the read stop circuit 86, and FIG. 19 shows the waveform data extension circuit 85.

The drive state counter 83 is for generating a signal representing the drive sequence state of the color PDP shown in FIG. 12. In FIG. 14, reference numeral 831 designates a counter, and characters XFCLR designates an initialization/start signal for the whole circuit. In accordance with the RMADCP output at the end of each period by the address memory circuit 82 and the carry of the counter of the address generation circuit, a pulse signal CTQEN shown in FIG. 12 is generated. At the same time, the count value is incremented, and the signals CTQ0 and CTQ1 indicating the drive sequence state of the color PDP undergo a change. Also, as described above, when the signal SUSO indicating the omission of the sustaining period of the minimum weighted subframe is H, the signal is skipped from the address period to the ROM address of the post-processing period. Accordingly, the signal representing the drive sequence state is required to change. In order to realize this, a multi-input NAND gate 832 is added. When the CTQ0 changes to L, the CTQ1 is H, the RMADCP is H and the QACO is H during the address period, a H state of the SUSO causes the output XCTQLD of the NAND gate 832 to change to L. Then, the counter 831 is impressed with H signals of D0 and D1, and both CTQ0 and CTQ1 change to 1 in order to meet the requirement for the post-processing period.

The address generation circuit 81 and the ROM 651 have substantially the same configuration as the corresponding ones of the conventional apparatus. In FIG. 15, reference numerals 812 and 813 represent counters. The counter 812 is for sequentially reading the regions A and B shown in FIG. 11 in a cycle, and generates the high-order address of the ROM 651. The counter 813, on the other hand, is for generating an address in each region, and is different from the corresponding circuit of the conventional apparatus in that, when the XCTQLD output from the drive state counter changes to L, the first address (RMADD0 to 9) during the post-processing period output from the ROM address memory circuit 82 is loaded on it, and the counting is continued from that time point. As a result, the process for omitting the sustaining period of a minimum subframe is realized.

Figure 16A:
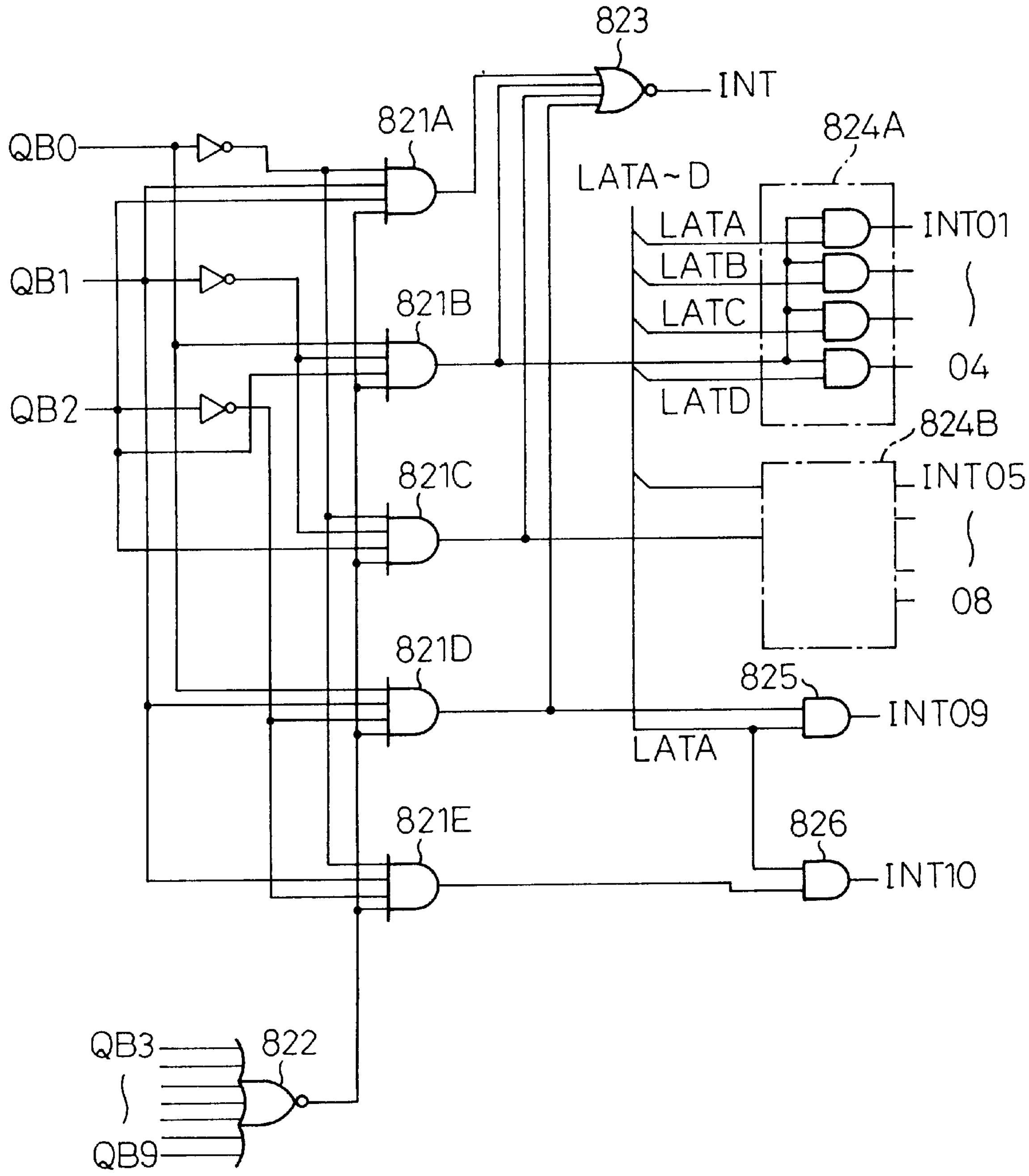
FIGS. 16A to 16C are diagrams showing a partial circuit configuration of a ROM address memory circuit according to an embodiment.
Figure 16B:
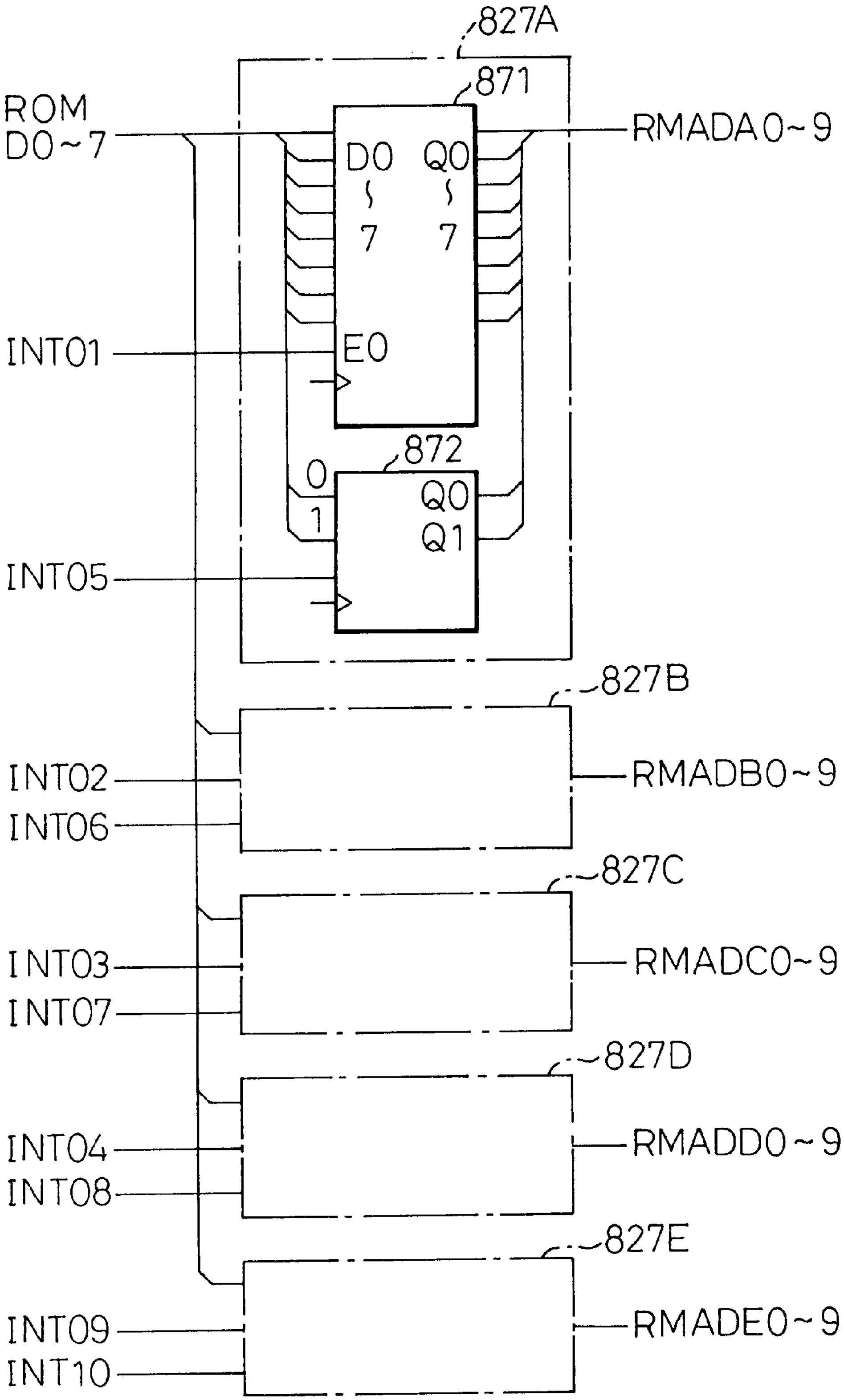
Figure 16C:
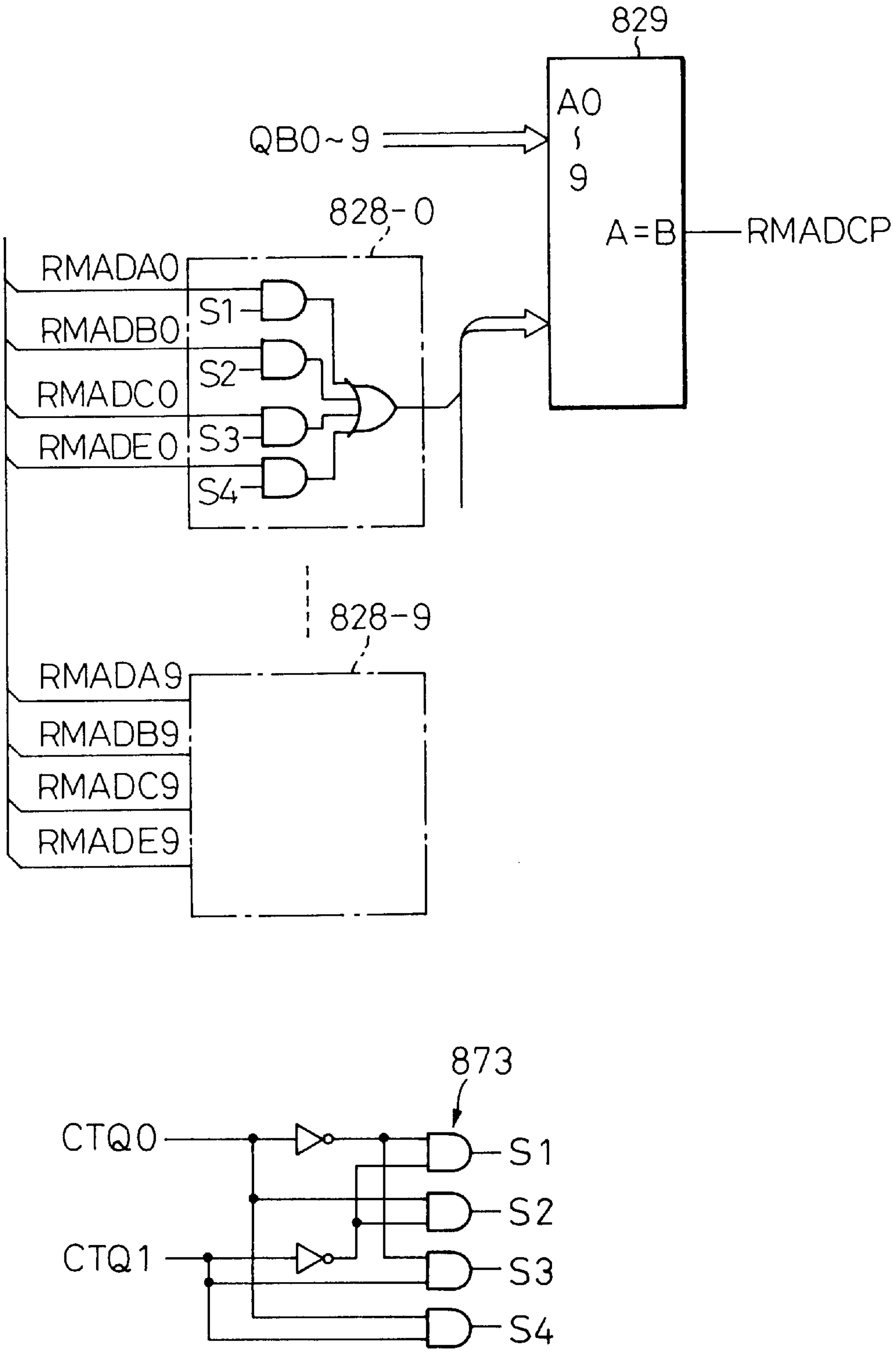

The ROM address memory circuit 82 has a configuration shown in FIGS. 16A to 16C. In FIGS. 16A to 16C, numerals 871 and 872 designate registers, and numeral 829 a comparator. The ROM address memory circuit 82 stores the ten low-order bits (the address in each region) of the ROM address at the end of each period of the drive sequence shown in FIG. 12, and generates a signal RMADCP indicating the termination of each period when the particular address coincides the ROM addresses QB0 to 0, respectively. Also, the ROM address memory circuit 82 stores the ROM address at the time of starting the post-processing period, and outputs an address for loading the counter 813 of the address generation circuit 81 when the XCTQLD changes to L.

The ROM data conversion circuit 84 has a configuration as shown in FIG. 17. Reference numerals 845A to 845C and 846A to 846D designate registers. This circuit is for sequentially reading four sets of 8-bit data from the regions A to D shown in FIG. 11 in four sessions, and collecting the whole data into 32-bit data. This circuit has a substantially similar configuration to the conventional counterpart, and will not be described again.

The read stop circuit 86 has a configuration shown in FIG. 18. Reference numeral 86 designates a counter. As described above, during the reset period when the bit D0 of the first ROM data in region A is "1" (H), the waveform data for the particular cycle is held to be output in an extension period. The extension period is included in the ROM data of the next cycle. The read stop circuit 86 is for performing this process, and when the bit D0 of the first ROM data in region A is H during the reset period, the output signal from the multi-input NAND gate 861 changes to H, so that the signal XLoad becomes H. It follows therefore that the data in region A indicating the extension period is loaded in the counter 864 in the next cycle. The signal LATDMK is input to the ROM data conversion circuit 84, and as long as the LATDMK remains H, the ROM data conversion circuit 84 maintains the output of the preceding cycle. At the same time, the signal CTQAMKO stops the counting operation of the address generation circuit. The counter 864 counts the loaded data indicating the extension period, and upon complete counting, the signal CTQAMK0 returns to L state to restore the normal state. In this way, the first method of extension process is performed during the reset period.

Figure 20A:
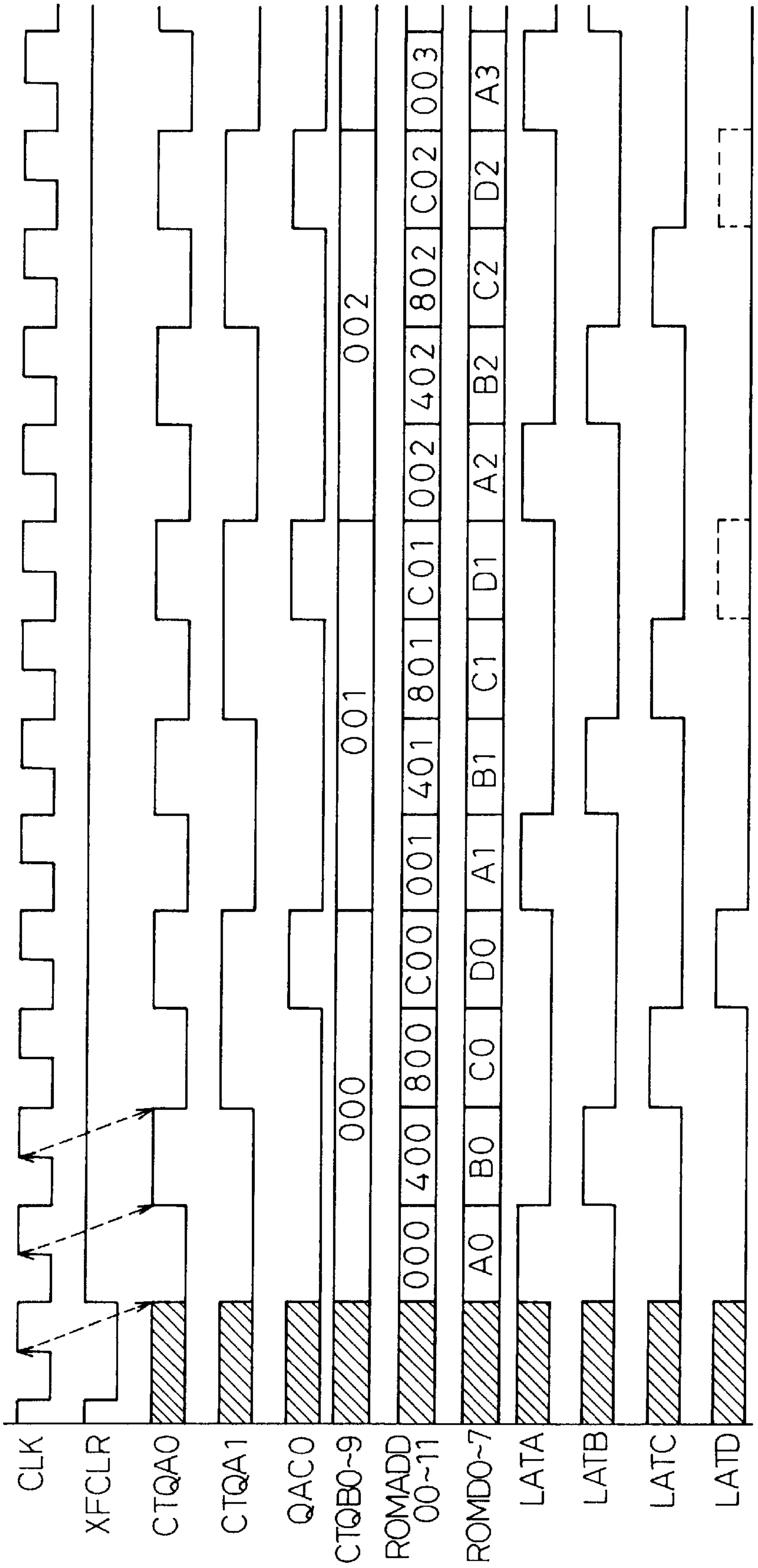
FIGS. 20A to 20F are diagrams showing time charts for the normal operation according to an embodiment.
Figure 20B:
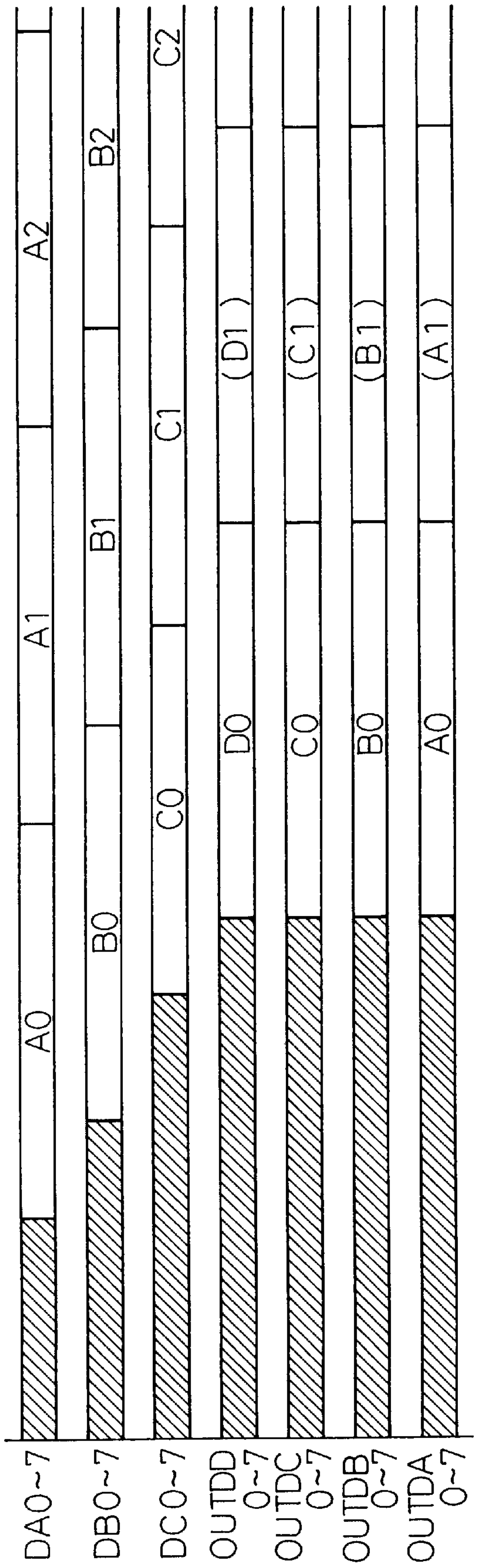
Figure 20C:
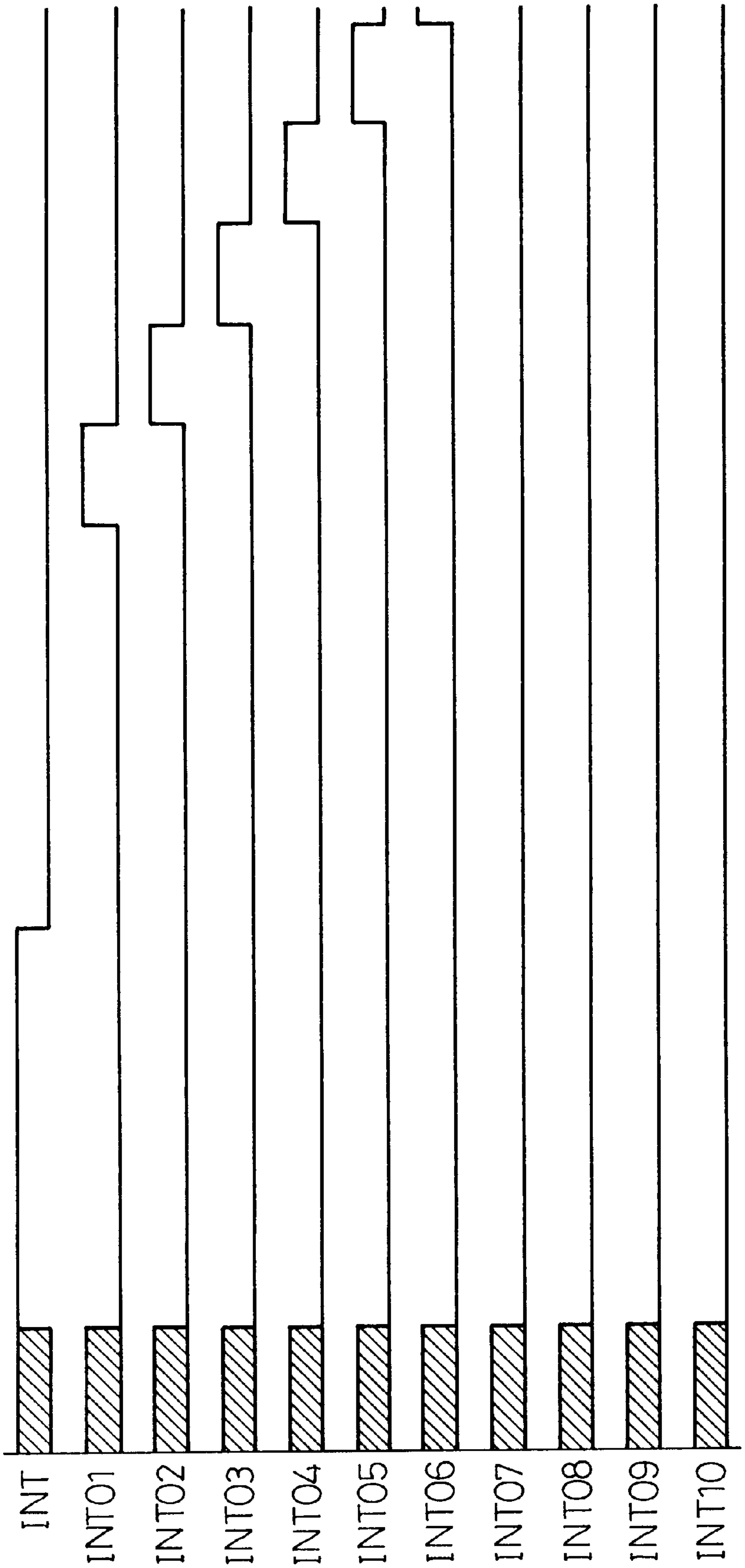
Figure 20D:
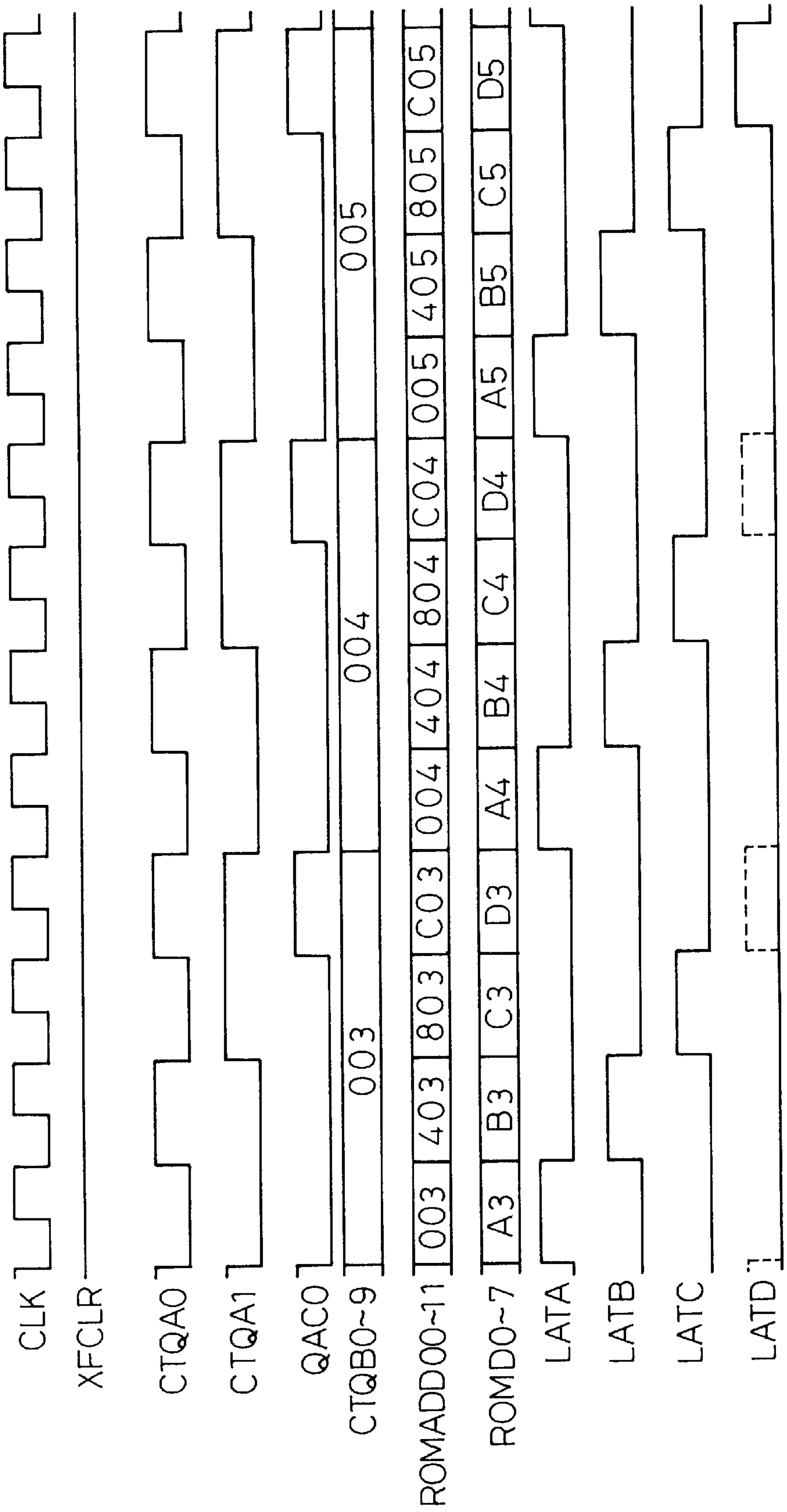
Figure 20E:
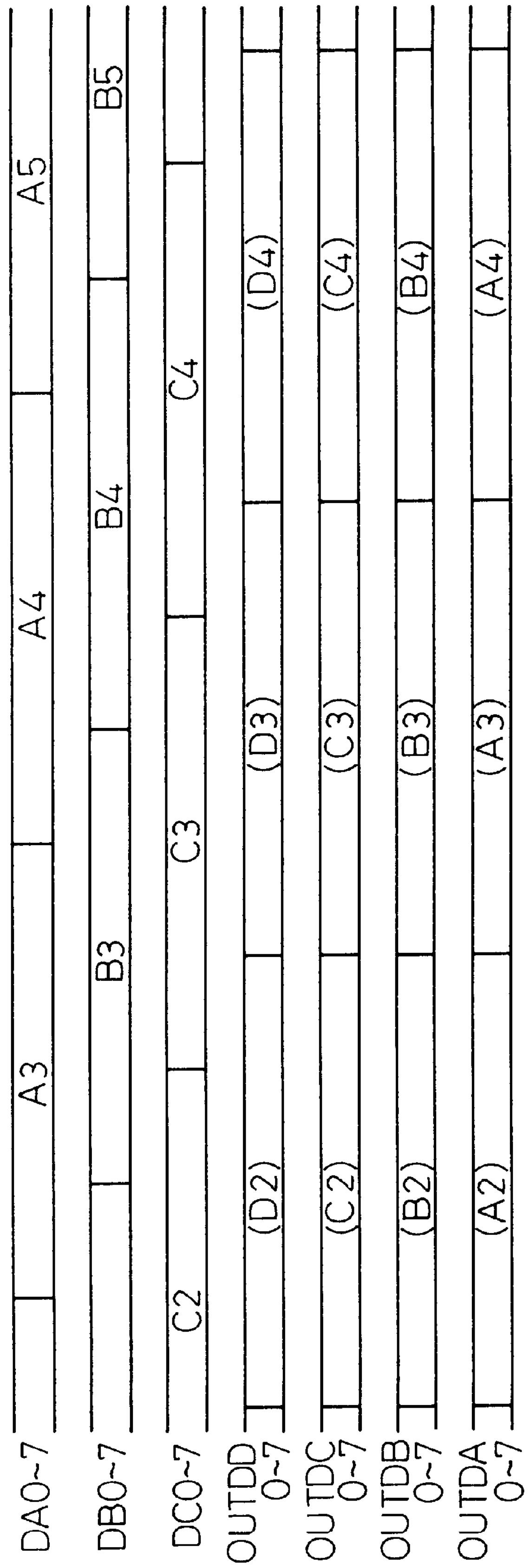
Figure 20F:
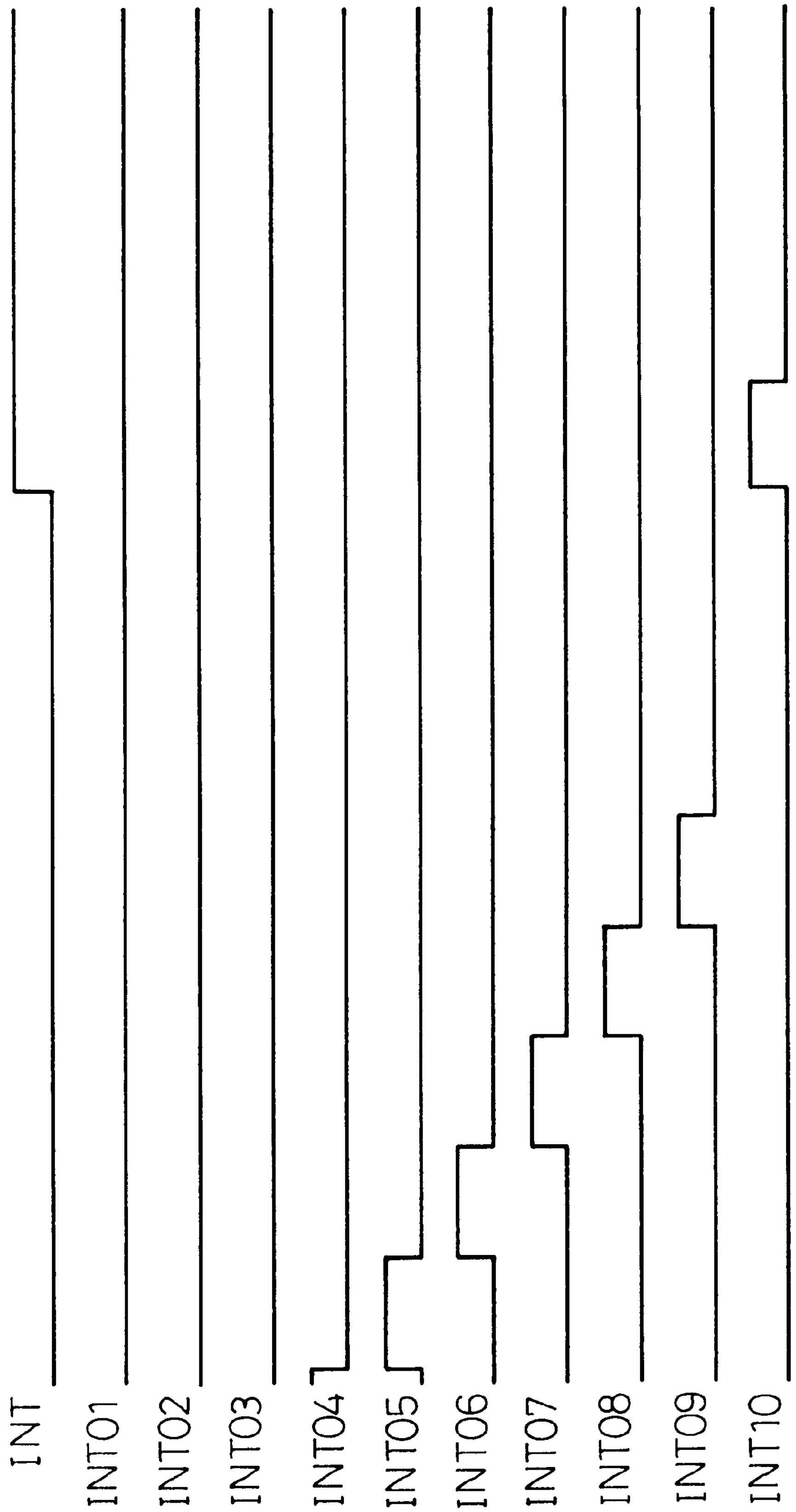
Figure 21A:
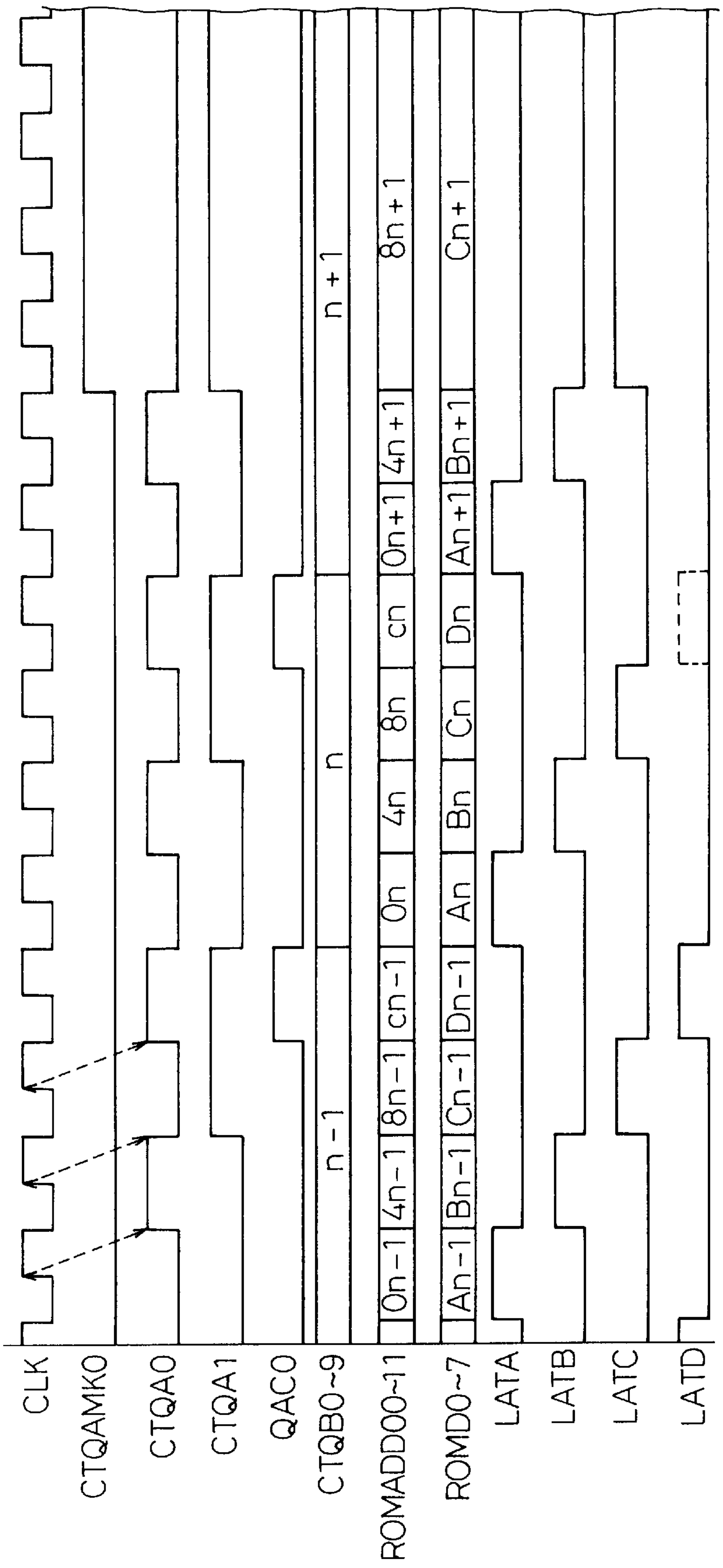
FIGS. 21A to 21D are time charts showing the read stop and the output holding operations according to an embodiment.
Figure 21B:
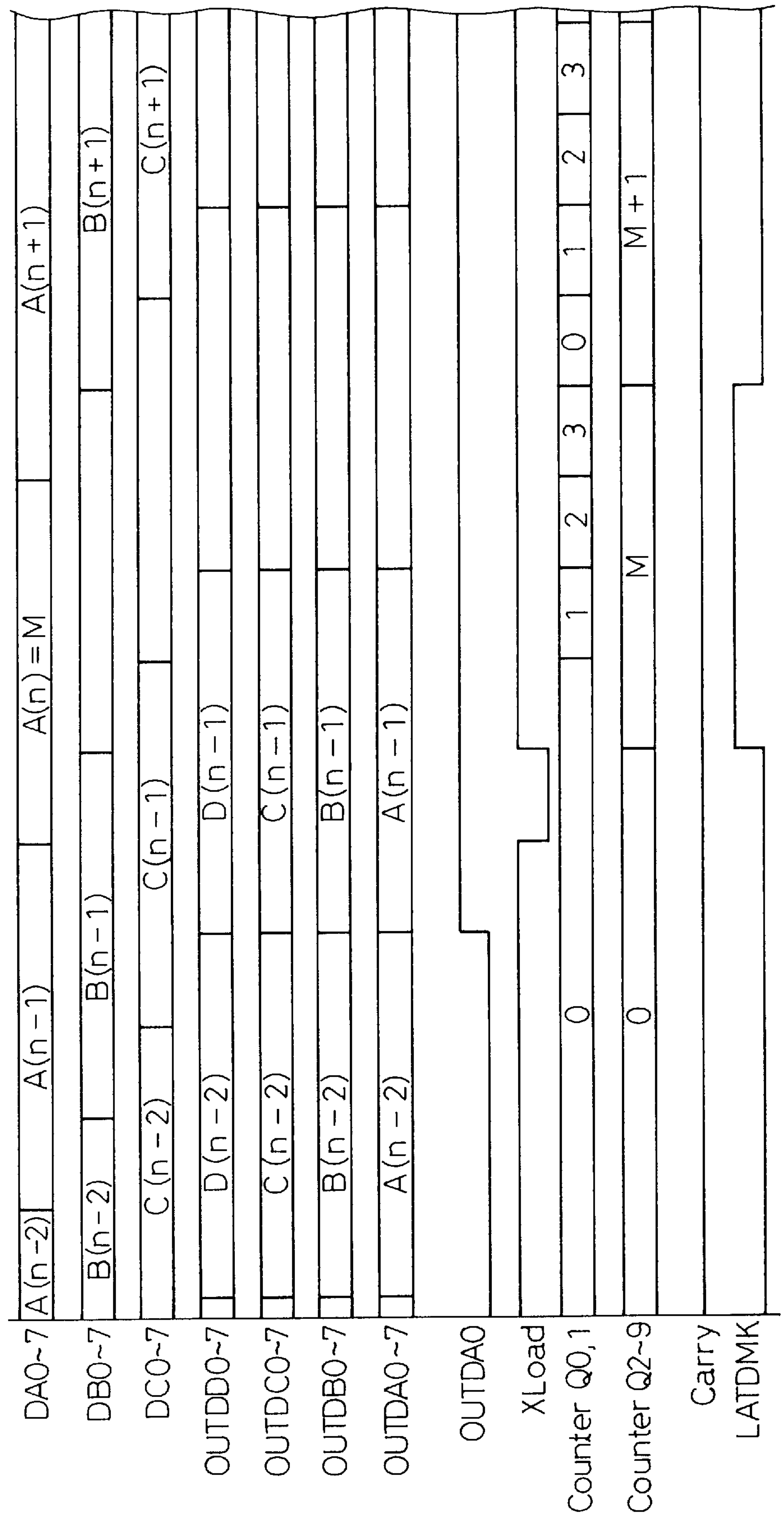
Figure 21C:
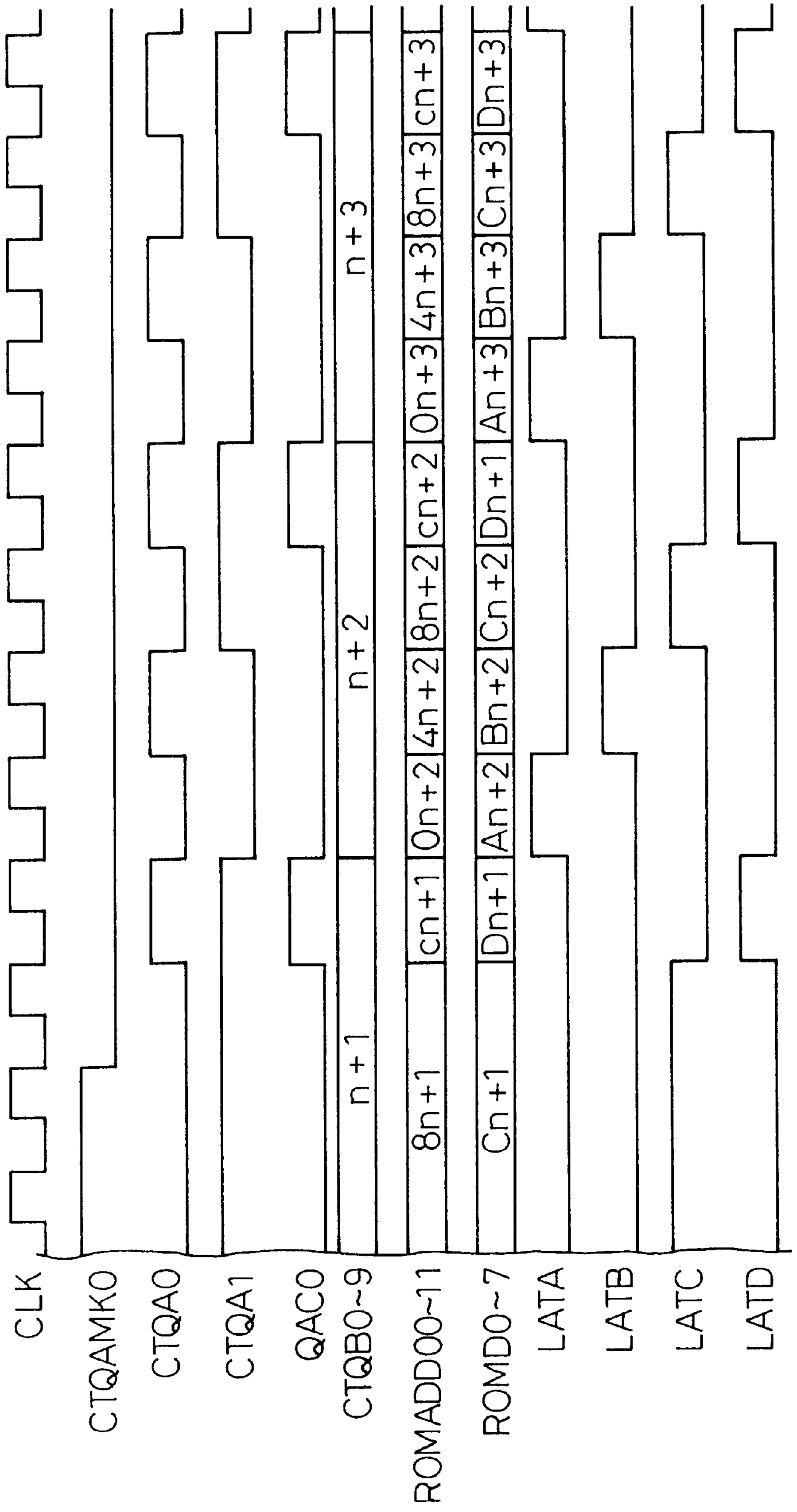
Figure 21D:
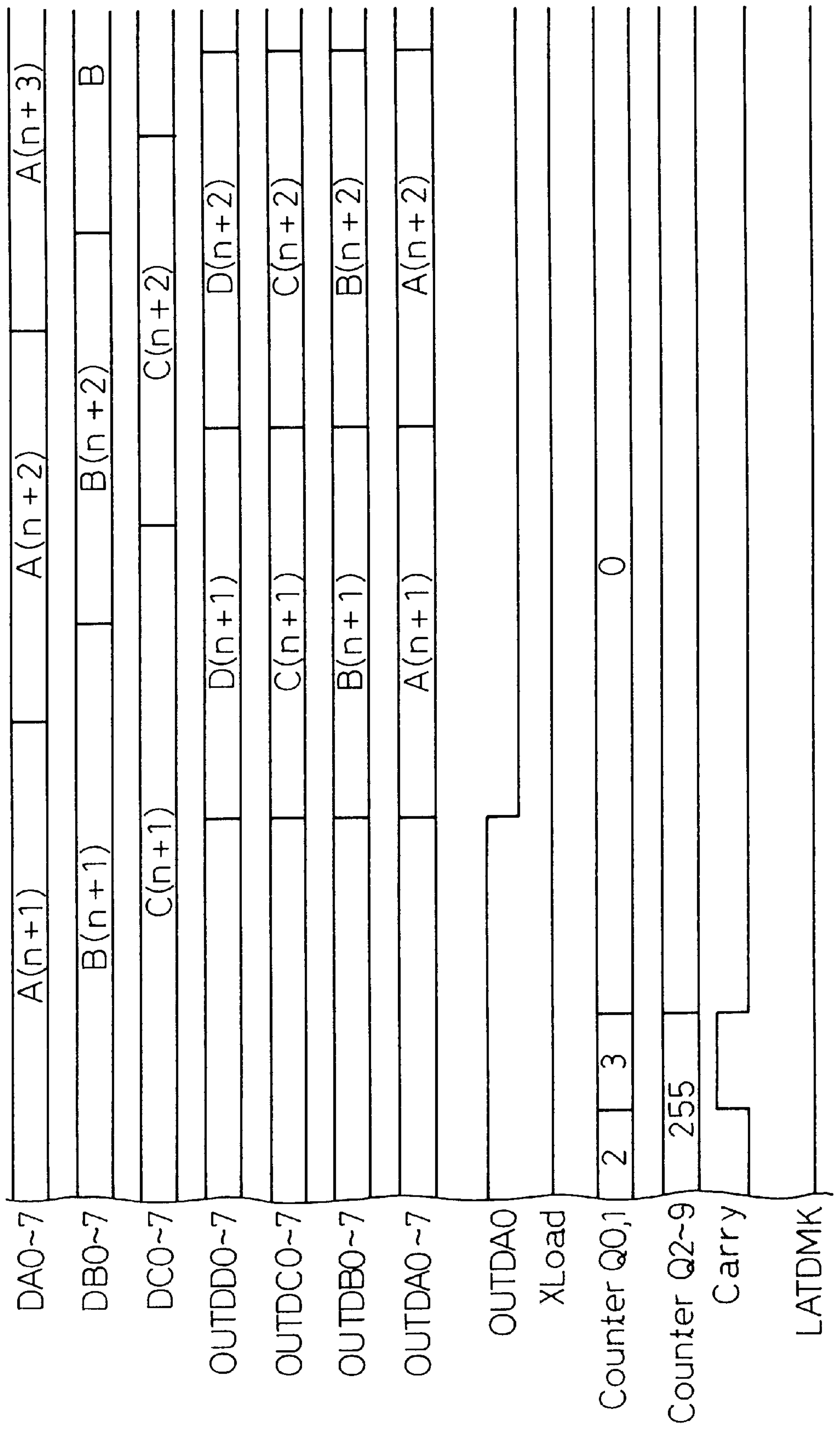

The waveform data extension circuit 85 has the configuration shown in FIG. 19. Reference numeral 856 designates a counter. The waveform data extension circuit 85 does not extend the waveform data when both the bits D0 and D1 of the ROM data in region A are 0 but extends the waveform data otherwise. When D0 and D1 are 1 and 0, respectively, on the other hand, the waveform data is extended by a one-fourth of a cycle; when D0 and D1 are 0 and 1, respectively, the waveform data is extended by one half cycle; and when D0 and D1 are 1 and 1, respectively, the waveform data is extended by a three fourth of a cycle. FIGS. 20A to 24B are timing charts showing the operation of each part of the drive wave generation circuit according to an embodiment. FIGS. 20A to 20F, FIGS. 21A to 21D, FIGS. 22A and 22B, FIGS. 23A and 23B, and FIGS. 24A and 24B represent illustrative segmentations for facilitating the understanding of the many signals shown, and each makes up a set of signals. FIGS. 20A to 20C represent signals on the same time axis. FIGS. 20D to 20F represent the signals portions temporally following FIGS. 20A to 20C. FIGS. 21A and 21B represent signals on the same time axis, and FIGS. 21C and 21D represent the signal portions temporally following FIGS. 21A and 21B, respectively. FIGS. 22A and 22B, FIGS. 23A and 23B and FIGS. 24A and 24B also have a common time axis.

FIGS. 20A to 20F show the operation from the start of the normal operation. In this case, the drive state counter 83 does not skip the reading or the read stop circuit 86 and the waveform data extension circuit 85 do not extend the waveform data but perform the same processing as in the conventional case.

FIGS. 21A to 21D show an example in which the ROM data bit indicating the extension is H for the cycle n−1 during the reset period, and M (not more than 255) is stored as data in region A for the next cycle, so that the waveform data of the cycle n−1 continues to be output until the data M is loaded in the counter 863 of the read stop circuit 86 and the carry is output when the count reaches 255.

Figure 22A:
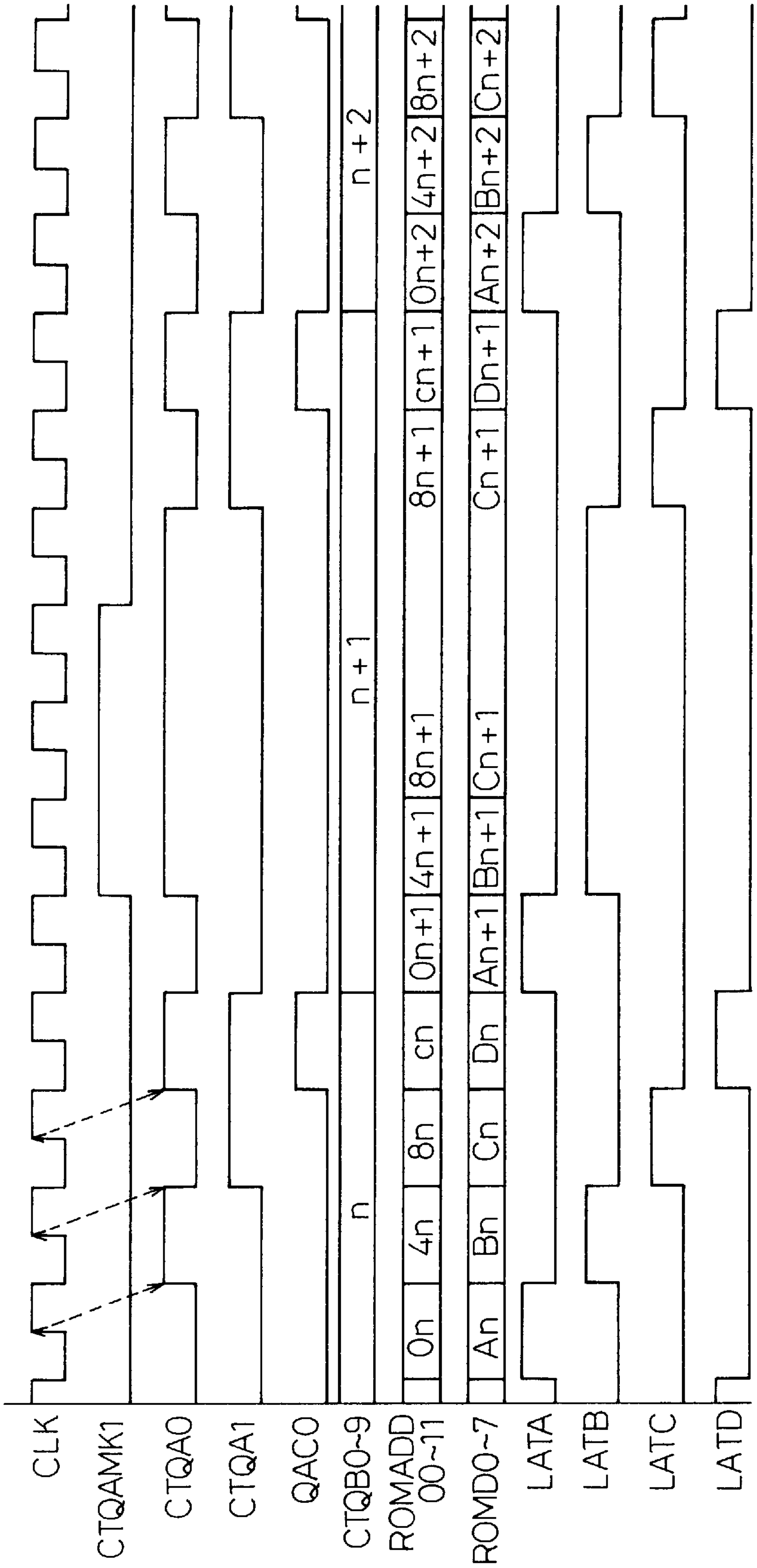
FIGS. 22A and 22B are time charts showing the operation for waveform data extension according to an embodiment.
Figure 22B:
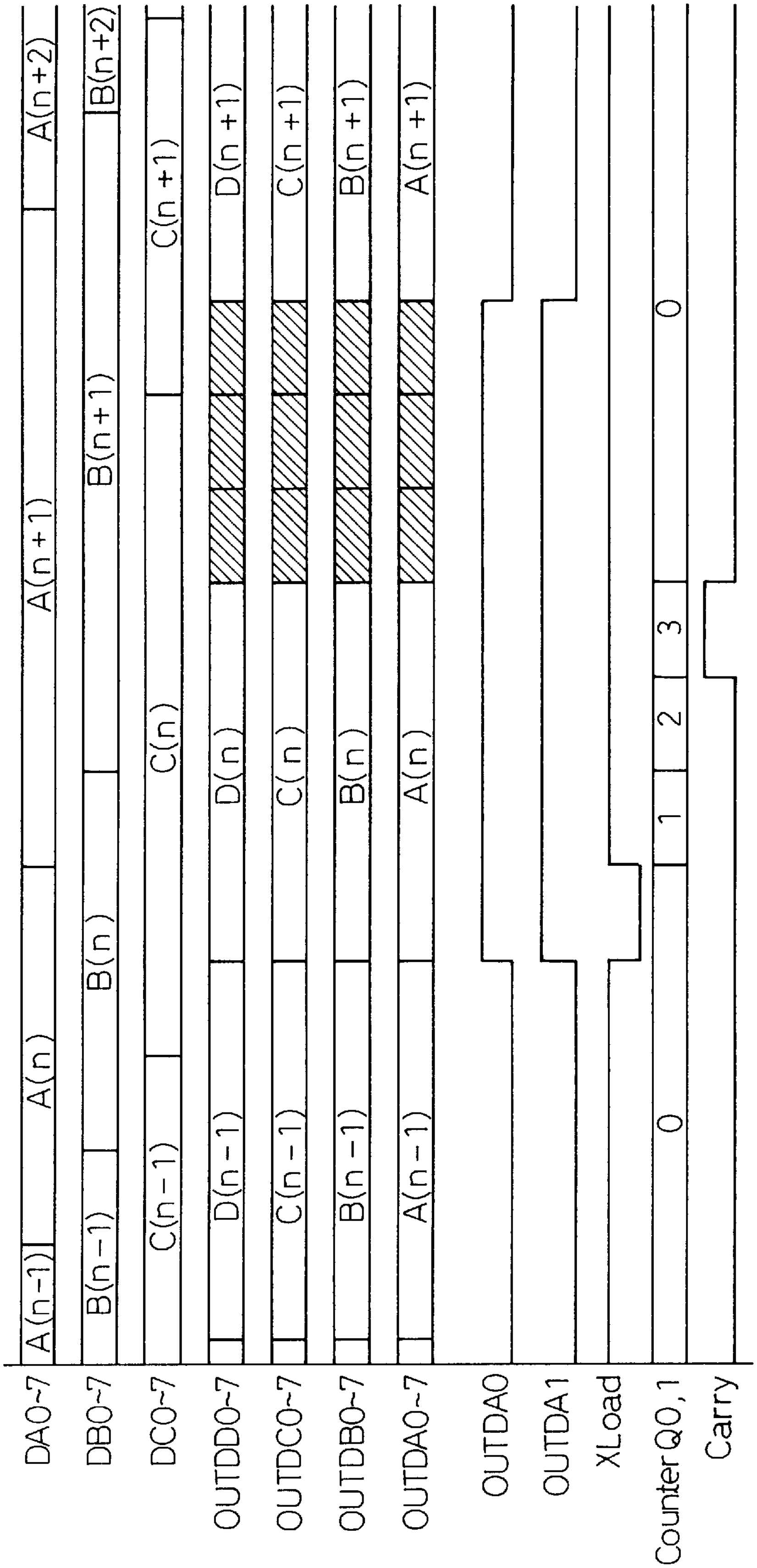
Figure 23A:
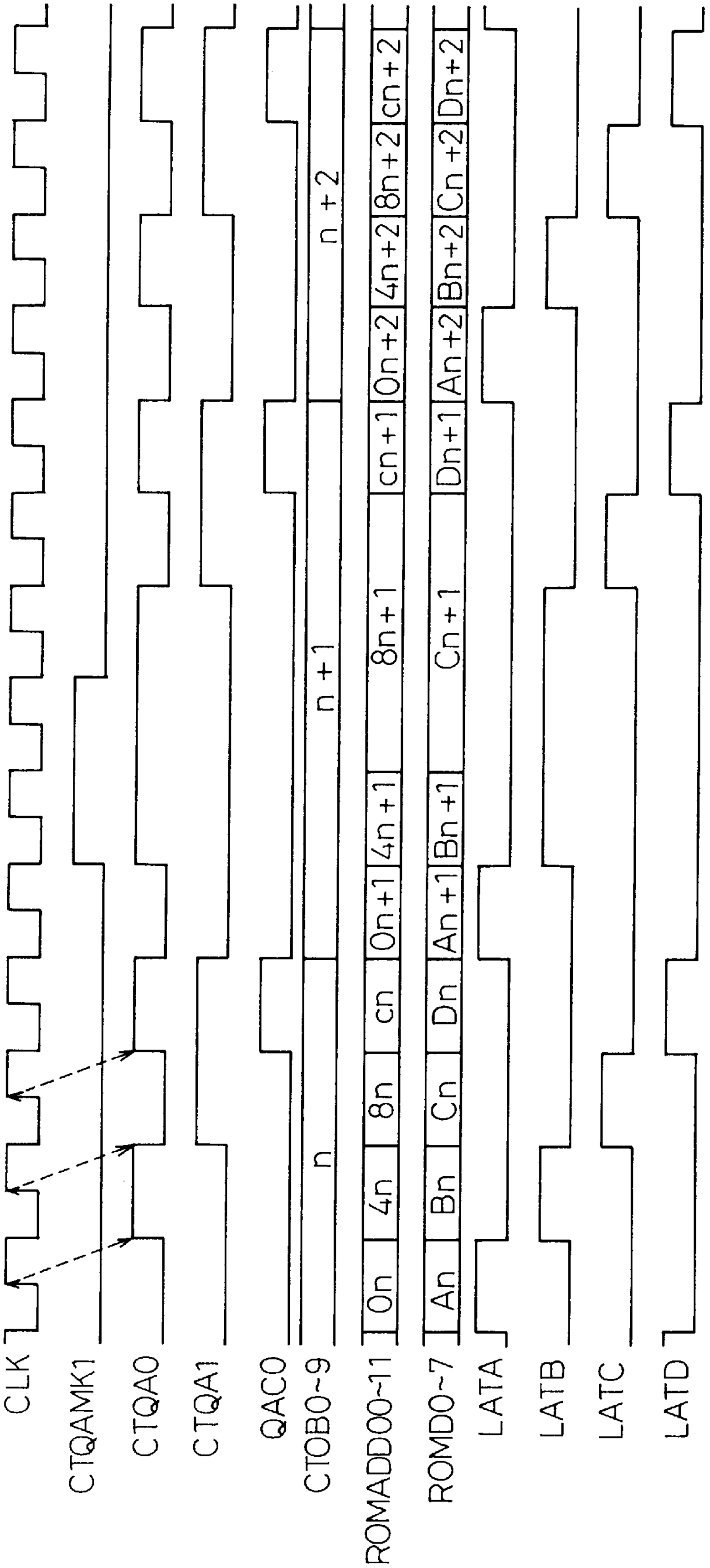
FIGS. 23A and 23B are time charts showing another operation for waveform data extension according to an embodiment.
Figure 23B:
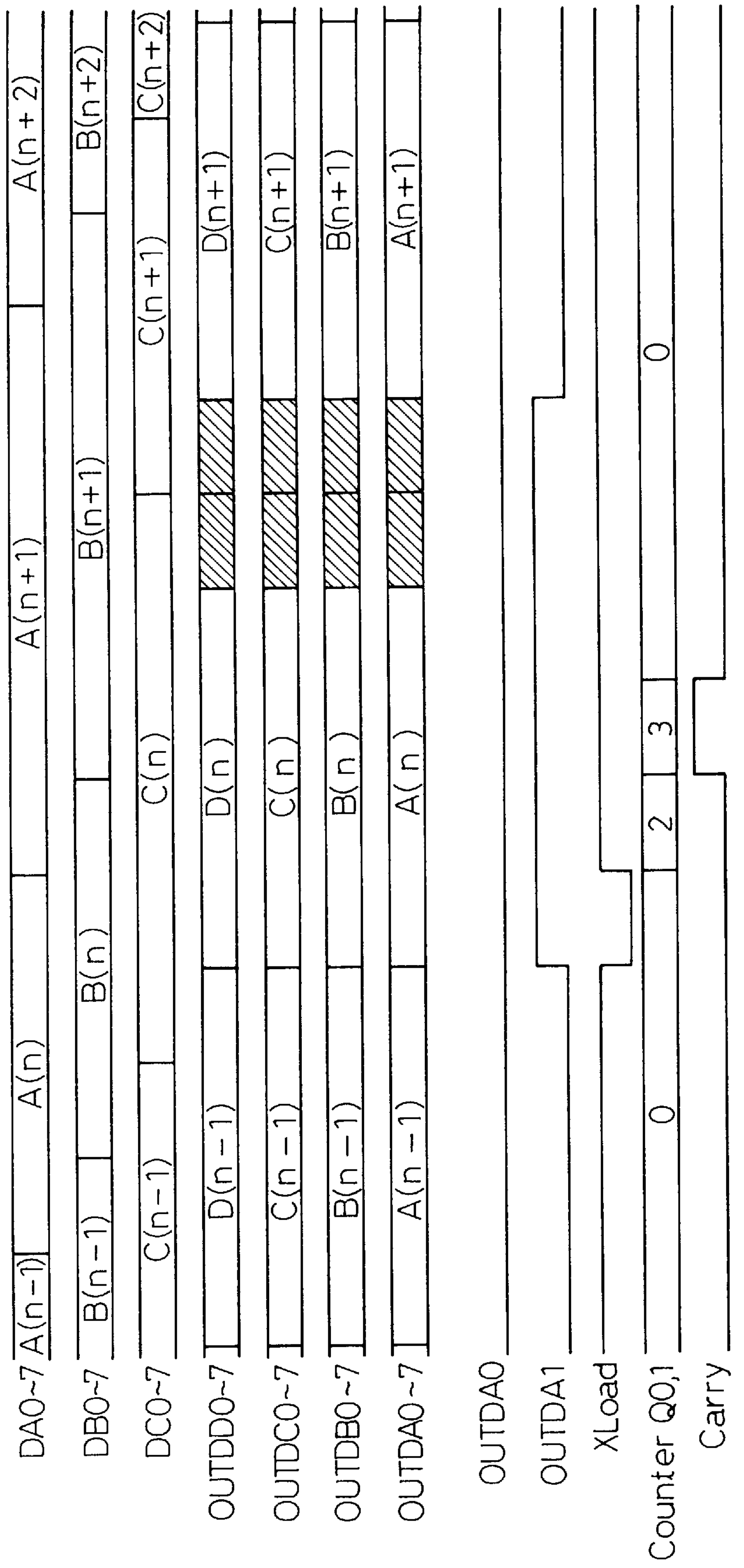

FIGS. 22A and 22B show the case in which both the ROM data bits D0 and D1 indicating the extension are 1 during the address period or during the sustaining period. FIGS. 23A and 23B, on the other hand, show the case in which D0 and D1 are 0 and 1, respectively. In FIGS. 22A and 22B, the waveform data output of the cycle n is extended by three fourths of a cycle (equivalent to three clocks), while in FIGS. 23A and 23B, the waveform data output of cycle n is extended by one half of a cycle (equivalent to two clocks).

Figure 24A:
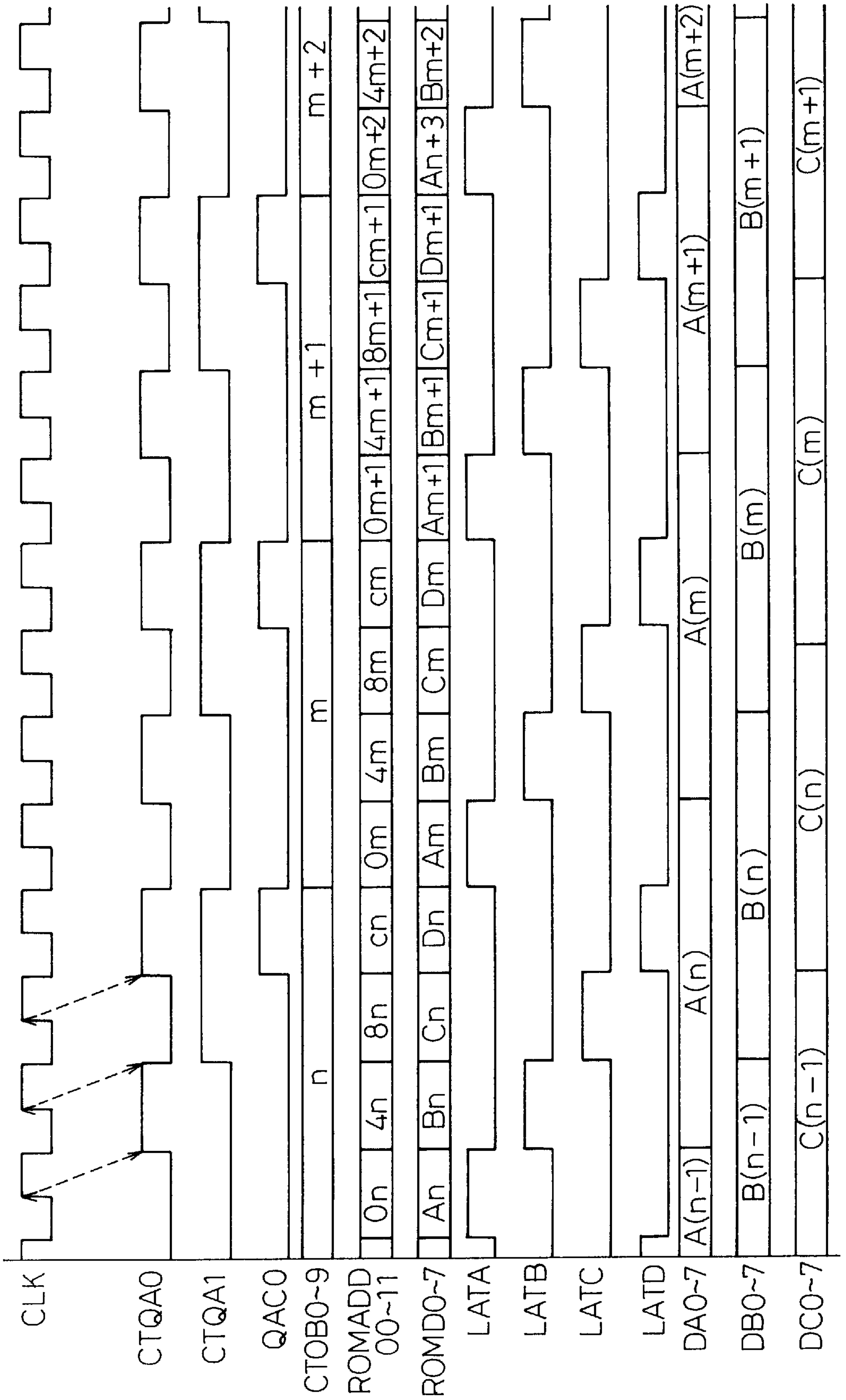
FIGS. 24A and 24B are time charts showing the skip operation according to an embodiment.
Figure 24B:
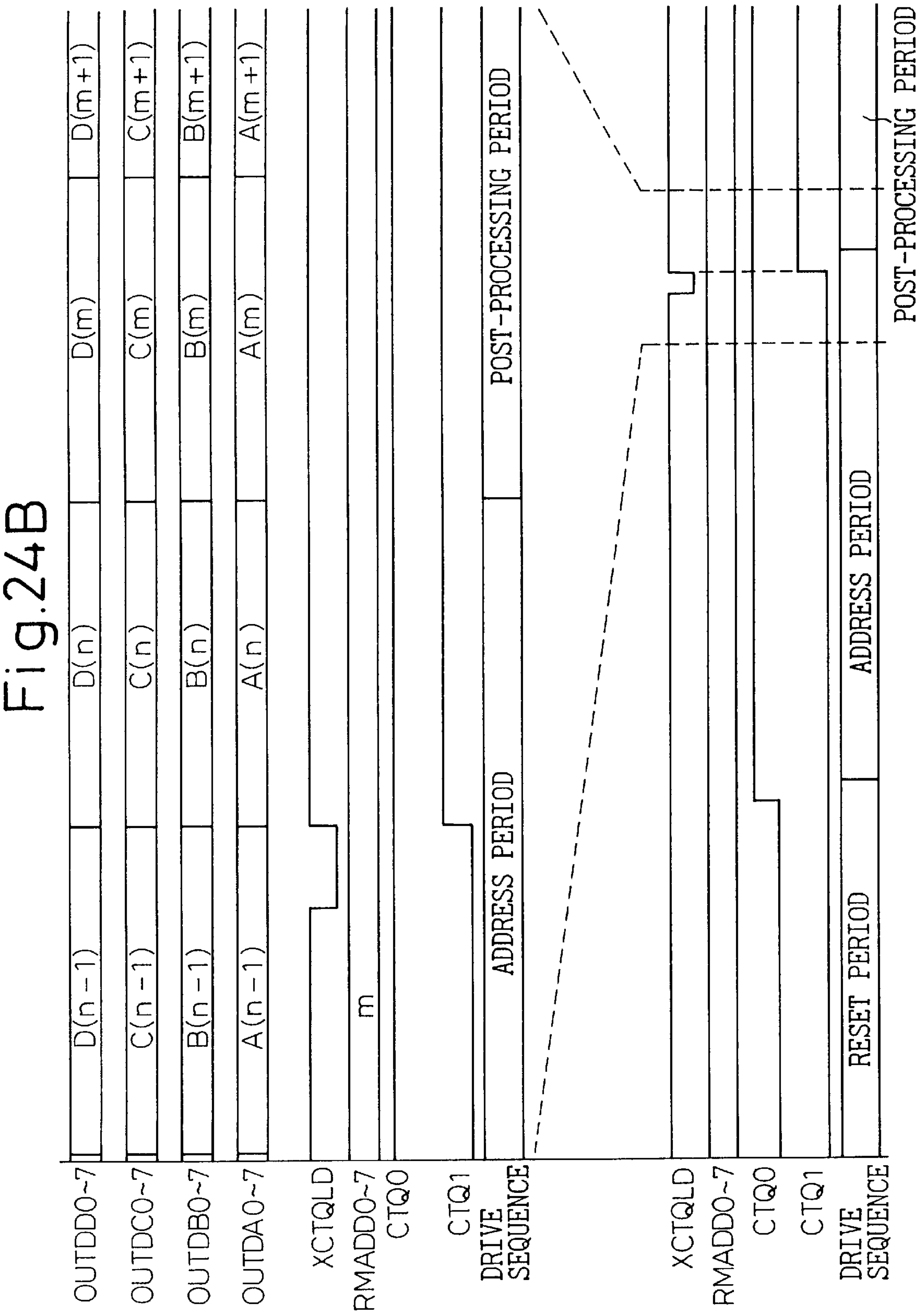

FIGS. 24A and 24B show the operation at about the end of the address period when the SUSO is H, i.e., when an instruction is issued for omitting the sustaining period of the minimum subframe. An XCTQLD detecting an address indicating the end of the address period is output, and accordingly, a H signal is loaded as CTQ0 and CTQ1. As a result, the post-processing period is started immediately after the address period.

An embodiment in which the present invention is applied to a wave generation circuit used for the PDP apparatus is explained above. The wave generation circuit according to this invention, however, is applicable not only to the PDP display apparatus but to any other devices for reading the control data for controlling the waveform data stored in a ROM and the generation thereof and generating a waveform appropriately.

It will thus be understood from the foregoing description that according to the present invention, the storage capacity of the ROM can be reduced and a more finely detailed waveform signal can be generated. As a result, the operation of a driver can be controlled more precisely for an improved quality of the color plasma display (PDP) apparatus.

What is claimed is:

1. A wave generation circuit generating a drive control signal, comprising:

- a ROM storing waveform data relating to a waveform and the generation of the waveform for each cycle;
- an address generation circuit sequentially generating address signals for sequentially reading said waveform data;
- a waveform data output circuit reproducing said read waveform data sequentially into a waveform signal, wherein said waveform data includes extension information for instructing to reproduce the waveform data in extension for a particular cycle; and
- an extension decision and control circuit for deciding on the presence or absence of said extension information from said read waveform data and, in the presence of said extension information, controlling said waveform data output circuit to maintain the output of a corresponding waveform signal while at the same time controlling said address generating circuit to retard the generation of the address signal.

2. A wave generation circuit according to claim 1, wherein:

- the extension information indicates the advisability of extending the waveform data and extension period information indicating a period of the extension; and said extension decision and control circuit controls said waveform data output circuit so as to maintain the output of a corresponding waveform signal during the period designated by said extension period information in the case where said waveform data includes said extension information.

3. A wave generation circuit according to claim 2, wherein:

said extension period information is included in the waveform data of the cycle next to said extension information, and the extension period indicated by said extension period information is a period equivalent to multiple said cycles; and when said waveform data includes said extension information, said extension decision and control circuit controls said waveform data output circuit to maintain the output of a corresponding waveform signal, extracts said extension period information from the waveform data of the next cycle, maintains the output of said waveform data output circuit during a period indicated by said extension period information less one cycle and retards the generation of the address signal by said address generation circuit.

4. A wave generation circuit according to claim 2, wherein:

said extension information is configured of a plurality of bits, said extension period information is indicated by a plurality of said bits of said extension information and the advisability of extension and the extension period are designated in accordance with a combination of a plurality of said bits.

5. A wave generation circuit according to claim 4, wherein:

the minimum unit of the extension periods designated by a plurality of said bits, is smaller than an individual said cycle.

6. A wave generating circuit generating a drive control signal, comprising:

a ROM storing waveform data relating to a waveform and the generation of the waveform for each cycle;

an address generation circuit sequentially generating address signals for sequentially reading said waveform data; and a skip decision circuit setting a skip address in said address generation circuit and controlling said address generation circuit to continue generating an address signal from said skip address in response to an external skip instruction in the case where the address signal generated by said address generation circuit reaches a predetermined value.

7. A flat matrix display apparatus comprising:

a display panel including a plurality of cells selectively emitting light by discharges therein;

a display data setting circuit setting a plurality of said cells to a state corresponding to display data;

a display illumination circuit controlling the emitting of light from the plurality of said cells set in the set state in accordance with the display data; and a drive waveform generation circuit generating a drive control signal supplied to said display data setting circuit and said display illumination circuit and comprising:

a ROM storing the waveform data relating to a waveform and the generation thereof for each cycle, an address generation circuit sequentially generating address signals for sequentially reading said waveform data, a waveform data output circuit sequentially reproducing said read waveform data into waveform signals, and an extension decision and control circuit deciding whether said waveform data includes extension information for instructing to reproduce the waveform data of a cycle in extension and, in the presence of said extension information, controlling said waveform data output circuit to maintain the output of a corresponding waveform signal while at the same time controlling said address generation circuit to retard the generation of the address signal.

8. A flat matrix display apparatus, comprising:

a display panel including a plurality of cells selectively caused to discharge for emitting light;

a display data setting circuit setting a plurality of said cells to a state corresponding to the display data; and a display illumination circuit controlling the emitting of light from the plurality of said cells set in the set state in accordance with the display data; and a drive waveform generation circuit generating a drive control signal supplied to said display data setting circuit and said display illumination circuit and comprising:

a ROM storing the waveform data relating to a waveform and the generation thereof for each cycle, an address generation circuit sequentially generating address signals for sequentially reading said waveform data, and a skip decision circuit setting said skip address in said address generation circuit and controlling said address generation circuit to continue generating an address signal from said skip address in response to an external skip instruction signal in the case where the address signal generated by said address generation circuit reaches a predetermined value.

* * * * *

UNITED STATES PATENT AND TRADEMARK OFFICE

CERTIFICATE OF CORRECTION

PATENT NO.: 6,052,105
DATED : April 18, 2000
INVENTOR(S): Akira YAMAMOTO et al.

It is certified that error appears in the above-identified patent and that said Letters Patent is hereby corrected as shown below:

Col. 13, line 35, change "periods" to --period,--.

Signed and Sealed this

Twenty-seventh Day of February, 2001

Attest:

NICHOLAS P. GODICI

Attesting Officer

*Acting Director of the United States Patent and Trademark Office*